United States Patent
Perry et al.

(10) Patent No.: US 8,566,125 B1
(45) Date of Patent: Oct. 22, 2013

(54) SYSTEMS AND METHODS FOR PERFORMING WORKFLOW

(75) Inventors: Timothy P. J. Perry, Lynchburg, VA (US); Michael David Metzger, Lynchburg, VA (US); Diane Marie Russell, Lynchburg, VA (US); Mary Kathryn Bryant, Forest, VA (US); David John Helt, Forest, VA (US)

(73) Assignee: Genworth Holdings, Inc., Richmond, VA (US)

( * ) Notice: Subject to any disclaimer, the term of this patent is extended or adjusted under 35 U.S.C. 154(b) by 1456 days.

(21) Appl. No.: 10/944,184

(22) Filed: Sep. 20, 2004

(51) Int. Cl.
*G06Q 40/00* (2012.01)

(52) U.S. Cl.
USPC ............. 705/4; 705/35; 705/38; 705/7.26

(58) Field of Classification Search
USPC .................... 705/4, 35–45; 719/316
See application file for complete search history.

(56) References Cited

U.S. PATENT DOCUMENTS

| | | |
|---|---|---|
| 4,837,693 A | 6/1989 | Schotz |
| 4,975,840 A | 12/1990 | DeTore et al. |
| 5,093,794 A | 3/1992 | Howie et al. |
| 5,218,539 A | 6/1993 | Elphick et al. |
| 5,235,654 A | 8/1993 | Anderson et al. |
| 5,235,702 A | 8/1993 | Miller |
| 5,359,509 A | 10/1994 | Little et al. |
| 5,557,515 A | 9/1996 | Abbruzzese et al. |
| 5,586,313 A | 12/1996 | Schnittker et al. |
| 5,619,694 A | 4/1997 | Shimazu |
| 5,636,117 A | 6/1997 | Rothstein |
| 5,809,478 A | 9/1998 | Greco et al. |
| 5,839,118 A | 11/1998 | Ryan et al. |
| 5,850,480 A | 12/1998 | Scanlon |
| 5,870,711 A | 2/1999 | Huffman |

(Continued)

FOREIGN PATENT DOCUMENTS

WO    WO03/102733    * 12/2003

OTHER PUBLICATIONS

Gallagher, Julie, "Customizing for Excellence," Insurance & Technology Magazine, Sep. 23, 2003.*

(Continued)

*Primary Examiner* — Robert Niquette
(74) *Attorney, Agent, or Firm* — Hunton & Williams LLP

(57) ABSTRACT

The systems and methods of the invention provide a workflow system for processing a financial application in an automated manner. The workflow system may include an interface portion, the interface portion inputting application information into the workflow system for processing by the workflow system and a workflow looping portion. The workflow looping portion may include performing underwriting processing to effect underwriting of the application based on the application information, performing issue processing to effect issue of the application, and performing settlement processing to effect settlement of the application. A rules logic portion may be provided to control the implementation of rules applied to the processing of the application as the application passes through the automated processing. The performing underwriting processing, performing issue processing and performing settlement processing are each performed in an automated manner to constitute automated processing of the application, such that the automated processing includes the performing underwriting processing, performing issue processing and performing settlement processing.

38 Claims, 14 Drawing Sheets

(56) References Cited

U.S. PATENT DOCUMENTS

| | | |
|---|---|---|
| 5,907,848 A | 5/1999 | Zaiken et al. |
| 5,930,759 A | 7/1999 | Moore et al. |
| 5,950,169 A | 9/1999 | Borghesi et al. |
| 5,987,434 A | 11/1999 | Libman |
| 5,991,733 A | 11/1999 | Aleia et al. |
| 6,003,007 A | 12/1999 | DiRienzo |
| 6,026,363 A | 2/2000 | Shepard |
| 6,076,066 A | 6/2000 | DiRienzo et al. |
| 6,122,633 A | 9/2000 | Leymann et al. |
| 6,149,055 A | 11/2000 | Gatto |
| 6,151,584 A | 11/2000 | Papierniak et al. |
| 6,246,991 B1 | 6/2001 | Abe et al. |
| 6,304,859 B1 | 10/2001 | Ryan et al. |
| 6,415,284 B1 | 7/2002 | D'Souza et al. |
| 6,505,176 B2 * | 1/2003 | DeFrancesco et al. ......... 705/38 |
| 6,574,634 B2 | 6/2003 | Woehl |
| 6,683,697 B1 | 1/2004 | Lech et al. |
| 6,684,188 B1 | 1/2004 | Mitchell et al. |
| 6,701,322 B1 | 3/2004 | Green |
| 6,704,015 B1 | 3/2004 | Bovarnick et al. |
| 6,725,220 B2 | 4/2004 | Stratigos et al. |
| 6,731,993 B1 | 5/2004 | Carter et al. |
| 6,826,539 B2 | 11/2004 | Loveland |
| 6,850,908 B1 * | 2/2005 | Smith et al. .................. 705/38 |
| 6,868,386 B1 | 3/2005 | Henderson et al. |
| 6,877,134 B1 | 4/2005 | Fuller et al. |
| 6,904,435 B2 | 6/2005 | Jenkins et al. |
| 6,912,502 B1 | 6/2005 | Buddle et al. |
| 6,922,720 B2 | 7/2005 | Cianciarulo et al. |
| 6,934,716 B2 | 8/2005 | Bradley et al. |
| 6,957,251 B2 | 10/2005 | Wisner et al. |
| 6,964,044 B1 | 11/2005 | Hudson et al. |
| 6,985,886 B1 * | 1/2006 | Broadbent et al. ............... 705/38 |
| 7,062,706 B2 | 6/2006 | Maxwell et al. |
| 7,117,450 B1 | 10/2006 | Chaudhri |
| 7,143,051 B1 | 11/2006 | Hanby et al. |
| 7,212,995 B2 * | 5/2007 | Schulkins ....................... 705/35 |
| 7,277,195 B2 | 10/2007 | Hamilton et al. |
| 7,325,076 B1 | 1/2008 | Morrison et al. |
| 7,343,307 B1 | 3/2008 | Childress |
| 7,383,239 B2 | 6/2008 | Bonissone et al. |
| 7,392,210 B1 * | 6/2008 | MacKay et al. ................ 705/35 |
| 7,430,516 B1 * | 9/2008 | Blair et al. ........................ 705/4 |
| 7,448,046 B2 * | 11/2008 | Navani et al. ................. 719/316 |
| 7,567,914 B2 | 7/2009 | Bonissone et al. |
| 7,596,501 B2 | 9/2009 | Tivey et al. |
| 7,599,842 B2 | 10/2009 | Tivey et al. |
| 7,617,240 B2 | 11/2009 | Guyan et al. |
| 7,627,490 B2 * | 12/2009 | Glick et al. ....................... 705/4 |
| 7,630,911 B2 | 12/2009 | Kay |
| 7,630,913 B2 | 12/2009 | Kay |
| 7,689,443 B2 | 3/2010 | Pepoon et al. |
| 7,698,159 B2 | 4/2010 | Metzger et al. |
| 7,734,536 B2 | 6/2010 | Amrhein et al. |
| 7,747,502 B2 | 6/2010 | Arnott et al. |
| 7,813,945 B2 | 10/2010 | Bonissone et al. |
| 7,818,186 B2 | 10/2010 | Bonissone et al. |
| 7,844,476 B2 | 11/2010 | Bonissone et al. |
| 7,844,477 B2 | 11/2010 | Bonissone et al. |
| 7,853,464 B2 * | 12/2010 | Bhatnagar et al. ............ 705/7.26 |
| 7,899,688 B2 | 3/2011 | Bonissone et al. |
| 7,953,636 B2 | 5/2011 | Steuart et al. |
| 7,962,385 B2 | 6/2011 | Falk et al. |
| 8,005,693 B2 | 8/2011 | Bonissone et al. |
| 8,055,514 B2 | 11/2011 | Elsholz |
| 8,073,714 B1 | 12/2011 | Ball |
| 8,121,871 B2 | 2/2012 | Young, III et al. |
| 8,171,487 B2 | 5/2012 | Buesing et al. |
| 8,185,463 B1 | 5/2012 | Ball |
| 8,271,301 B1 | 9/2012 | Nordyke et al. |
| 8,355,930 B2 | 1/2013 | Tholl et al. |
| 8,359,258 B2 | 1/2013 | Michalowski et al. |
| 2001/0014877 A1 * | 8/2001 | Defrancesco et al. ......... 705/38 |
| 2001/0044735 A1 | 11/2001 | Colburn et al. |
| 2001/0049611 A1 | 12/2001 | Peach |
| 2001/0053986 A1 | 12/2001 | Dick |
| 2001/0056362 A1 | 12/2001 | Hanagan et al. |
| 2002/0049618 A1 | 4/2002 | McClure et al. |
| 2002/0055862 A1 * | 5/2002 | Jinks ................... 705/4 |
| 2002/0062240 A1 | 5/2002 | Morinville |
| 2002/0069090 A1 | 6/2002 | De Grosz et al. |
| 2002/0077860 A1 | 6/2002 | Earnest et al. |
| 2002/0091550 A1 * | 7/2002 | White et al. ....................... 705/4 |
| 2002/0095317 A1 | 7/2002 | McCabe |
| 2002/0111834 A1 | 8/2002 | Kogure |
| 2002/0111835 A1 * | 8/2002 | Hele et al. ......................... 705/4 |
| 2002/0116231 A1 * | 8/2002 | Hele et al. ......................... 705/4 |
| 2002/0120474 A1 | 8/2002 | Hele et al. |
| 2002/0156656 A1 * | 10/2002 | Harrell et al. ................... 705/4 |
| 2002/0161674 A1 | 10/2002 | Scheer |
| 2002/0188497 A1 | 12/2002 | Cerwin |
| 2002/0194047 A1 | 12/2002 | Edinger et al. |
| 2003/0028404 A1 | 2/2003 | Herron et al. |
| 2003/0061330 A1 | 3/2003 | Frisco et al. |
| 2003/0069760 A1 | 4/2003 | Gelber |
| 2003/0074247 A1 | 4/2003 | Dick et al. |
| 2003/0078816 A1 * | 4/2003 | Filep .................. 705/4 |
| 2003/0088443 A1 | 5/2003 | Majikes et al. |
| 2003/0101133 A1 * | 5/2003 | DeFrancesco et al. ......... 705/38 |
| 2003/0110070 A1 | 6/2003 | De Goeij |
| 2003/0135453 A1 | 7/2003 | Caulfield et al. |
| 2003/0144874 A1 | 7/2003 | Barret et al. |
| 2003/0145124 A1 | 7/2003 | Guyan et al. |
| 2003/0167199 A1 | 9/2003 | Thomann et al. |
| 2003/0177032 A1 | 9/2003 | Bonissone et al. |
| 2003/0182159 A1 | 9/2003 | Bonissone et al. |
| 2003/0187693 A1 | 10/2003 | Oka et al. |
| 2003/0187699 A1 | 10/2003 | Bonissone et al. |
| 2003/0233260 A1 | 12/2003 | Snell et al. |
| 2004/0002893 A1 | 1/2004 | Feher |
| 2004/0003353 A1 | 1/2004 | Rivera et al. |
| 2004/0004453 A1 | 1/2004 | Junnan et al. |
| 2004/0039623 A1 | 2/2004 | Setteducati |
| 2004/0044763 A1 | 3/2004 | Besson |
| 2004/0064402 A1 | 4/2004 | Dreyer et al. |
| 2004/0068501 A1 | 4/2004 | McGoveran |
| 2004/0078243 A1 | 4/2004 | Fisher |
| 2004/0093241 A1 | 5/2004 | Stone et al. |
| 2004/0093242 A1 | 5/2004 | Cadigan et al. |
| 2004/0111284 A1 | 6/2004 | Uijttenbroek |
| 2004/0111302 A1 | 6/2004 | Falk et al. |
| 2004/0111346 A1 * | 6/2004 | Macbeath et al. ............... 705/35 |
| 2004/0123202 A1 | 6/2004 | Talagala et al. |
| 2004/0128172 A1 | 7/2004 | Van Cleave et al. |
| 2004/0128182 A1 | 7/2004 | Pepoon |
| 2004/0138997 A1 * | 7/2004 | DeFrancesco et al. ......... 705/38 |
| 2004/0167850 A1 | 8/2004 | Dreyer et al. |
| 2004/0243509 A1 * | 12/2004 | Schulkins ....................... 705/38 |
| 2004/0260566 A1 | 12/2004 | King |
| 2004/0260594 A1 | 12/2004 | Maddox et al. |
| 2005/0010454 A1 | 1/2005 | Marks et al. |
| 2005/0022122 A1 | 1/2005 | Barrus et al. |
| 2005/0027651 A1 * | 2/2005 | DeVault ........................ 705/38 |
| 2005/0049961 A1 * | 3/2005 | Hansen ......................... 705/38 |
| 2005/0075911 A1 | 4/2005 | Craven, Jr. |
| 2005/0080649 A1 | 4/2005 | Alvarez et al. |
| 2005/0114243 A1 * | 5/2005 | Scumniotales et al. ......... 705/35 |
| 2005/0119920 A1 | 6/2005 | Murphy et al. |
| 2005/0125253 A1 | 6/2005 | Bonissone et al. |
| 2005/0144047 A1 | 6/2005 | Tran et al. |
| 2005/0182666 A1 | 8/2005 | Perry et al. |
| 2005/0182667 A1 | 8/2005 | Metzger et al. |
| 2005/0246200 A1 | 11/2005 | Thomson et al. |
| 2006/0026044 A1 | 2/2006 | Smith, II |
| 2006/0167735 A1 | 7/2006 | Ward |
| 2006/0241982 A1 | 10/2006 | Seifert et al. |
| 2006/0253305 A1 | 11/2006 | Dougherty |
| 2006/0253351 A1 * | 11/2006 | Keaney ........................ 705/35 |
| 2006/0271412 A1 | 11/2006 | Sohr et al. |
| 2007/0118554 A1 | 5/2007 | Chang et al. |
| 2008/0103836 A1 | 5/2008 | Park et al. |
| 2009/0192828 A1 | 7/2009 | Yunker et al. |
| 2009/0222289 A1 | 9/2009 | Helmus et al. |
| 2009/0240531 A1 | 9/2009 | Hilborn |

(56) References Cited

U.S. PATENT DOCUMENTS

2009/0240532 A1 9/2009 Gore et al.
2009/0281841 A1 11/2009 Basak et al.
2009/0287509 A1 11/2009 Basak et al.
2009/0299776 A1 12/2009 Gore et al.
2011/0218827 A1 9/2011 Kenefick et al.
2012/0016693 A1 1/2012 Haywood et al.
2012/0330692 A1 12/2012 Read et al.

OTHER PUBLICATIONS

Gallagher, Julie, Customizing for Excellence, Insurance & Technology, Sep. 23, 2003.*
D. Baker et al., "Providing Customized Process and Situation Awareness in the Collaboration management Infrastructure", IEEE 1999, pp. 79-91.*

* cited by examiner

Fig. 4

TABLE - TASK DEFINITIONS

| | CASE | DOCUMENT |
|---|---|---|
| DISCREPANCY TASK | YES | YES |
| REVIEW TASK | YES | YES |
| VERIFY (VT) TASK | NOT APPLICABLE | YES |

Fig. 6 — BACKGROUND ART

BENEFITS OF THE GENERALIZED IMAGE SYSTEM

- Abstracts underlying image system and capabilities to provide common interface for systems.
- Adds diverse geographic caching abilities to any image system.
- Translates request formats on the fly for viewing.
- Creates bridge between image system(s) and business workflow
- Allows for multiple image systems to be accessed from a single process
- Allows for new image systems to be plugged into existing architecture, transparent to the client systems.
- Allows for multiple types of clients to access all available data (since data that client may not be able to understand is translated into its native format)
- Allows for access of some data even when image system is down (must be cached)
- Can run on independent architectures.
- Distributes network load.

Fig. 12

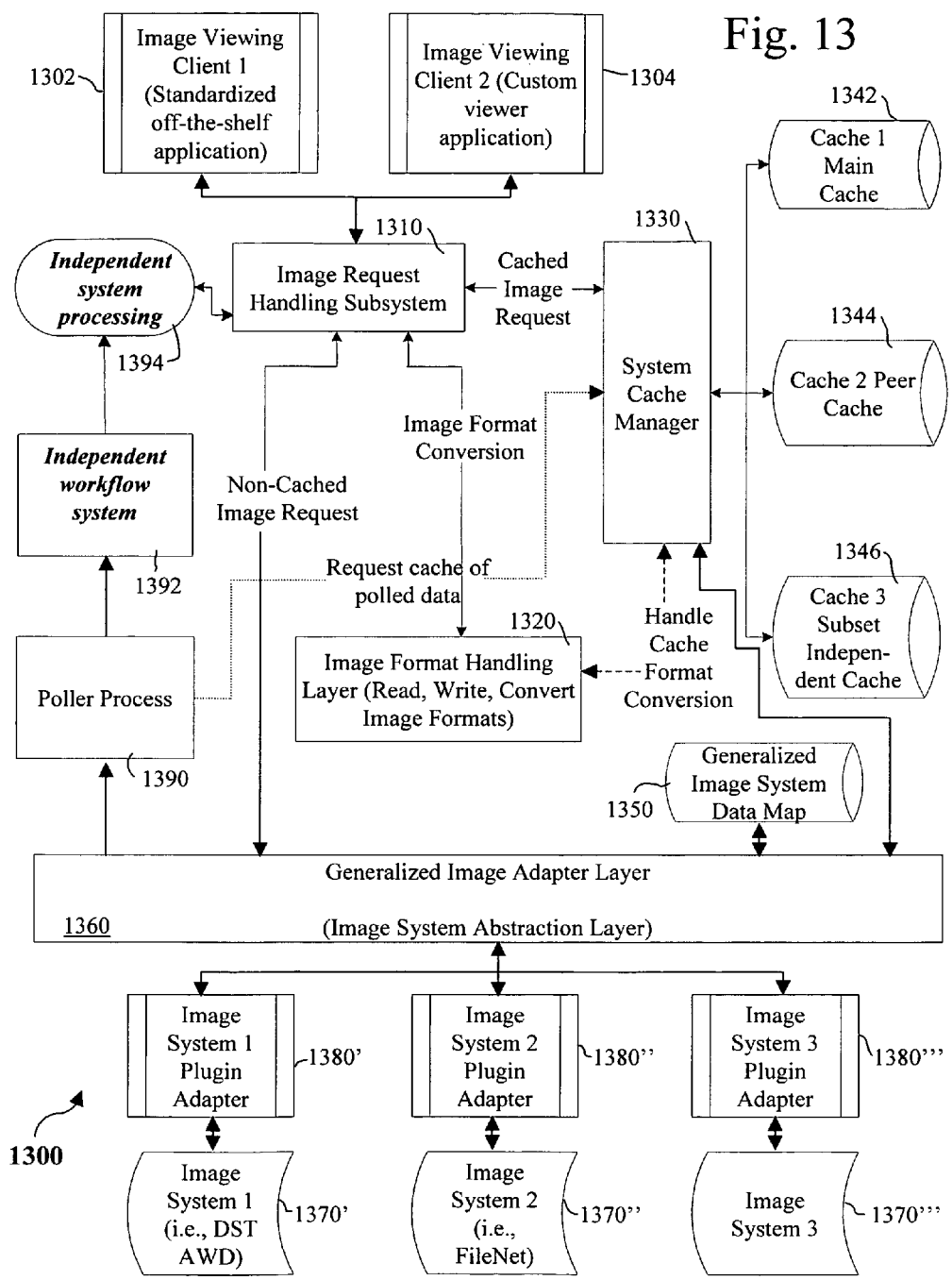

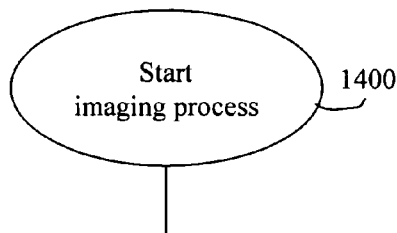

Fig. 14

1400 Start imaging process

1410 The system cache manager (1330) is asked to check its caches (any of the configured caches 1342, 1344, 1346) for the requested image. If an image and its associated meta-data is available in one of the caches then the data is returned to the request handling subsystem.

1420 If no data is returned from the system cache manager then a request is made to the generalized image adapter layer (1360) for the image content.

1430 If no content is returned from either system then an appropriate error message is returned to the client, indicating that the image is either irretrievable or not an image in the system, whichever is appropriate.

1440 If content is available from either the call in (1410) or (1420), then the image format is checked against the format the viewing client is requesting. If any format conversion needs to be done then the data is sent to the image format handling layer (1320) for conversion and the appropriate content data is returned.

1450 The now appropriately formatted image data is returned to the requesting client for rendering.

1460 End imaging process

SYSTEMS AND METHODS FOR PERFORMING WORKFLOW

This application is related to U.S. application Ser. No. 10/944,185 filed Sep. 20, 2004 entitled SYSTEMS AND METHODS FOR PROVIDING ACCESS TO AN IMAGE, which is incorporated herein in its entirety.

BACKGROUND OF THE INVENTION

The systems and methods of the invention are directed to the processing of applications in the financial services industry.

In the financial services industry, applications for a financial product or service come into a firm or other company environment. These applications are obtained from any of a wide variety of sources and typically respectively pertain to a variety of products offered by the particular company. The effective and efficient processing of such applications are critical to the survival of a financial services entity. However, the processing of these applications is very complex due to various reasons, including the needed detail involved in such applications. Processing of the applications is further complicated by the mandates of state and federal regulations. These regulations are often situation dependent making processing of applications more complex. Adding further complexity is the fact that applicable regulations often vary between states. A further known complication is effectively accessing and using documents that are needed for processing of applications. As one can imagine, effective access to needed documents is critical to business success in a highly competitive market.

As is known, the processing of an application in the financial services industry, such as an insurance application, involves many phases. For an insurance application, these phases might include the initial processing of an application, interacting with the customer to secure needed items or information, and then underwriting of the application. However, various other phases may be involved in the processing of an insurance application, not to mention the processing of other financial products.

As might be expected, various approaches are known to effect the processing of such applications in the financial services industry. At the most basic level, such applications are processed by hand, moving from one person to another as the application process proceeds. However, known processes fail to provide the automation and functionality needed to process such applications in an efficient and effective manner.

The methods and systems of the invention address the above, as well as other problems and shortcomings of known techniques for processing applications.

BRIEF SUMMARY OF THE INVENTION

The systems and methods of the invention provide a workflow system for processing a financial application in an automated manner. The workflow system may include an interface portion, the interface portion inputting application information into the workflow system for processing by the workflow system and a workflow looping portion. The workflow looping portion may include performing underwriting processing to effect underwriting of the application based on the application information, performing issue processing to effect issue of the application, and performing settlement processing to effect settlement of the application. A rules logic portion may be provided to control the implementation of rules applied to the processing of the application as the application passes through the automated processing. The performing underwriting processing, performing issue processing and performing settlement processing are each performed in an automated manner to constitute automated processing of the application, such that the automated processing includes the performing underwriting processing, performing issue processing and performing settlement processing.

BRIEF DESCRIPTION OF THE DRAWINGS

The present invention can be more fully understood by reading the following detailed description together with the accompanying drawings, in which like reference indicators are used to designate like elements, and in which:

FIG. 4 is a table showing task definitions in accordance with one embodiment of the invention;

FIG. 12 is a block diagram showing details of the generalized image system in accordance with one embodiment of the invention.

FIG. 13 is a block diagram showing an image system in accordance with one embodiment of the invention; and FIG. 14 is a flowchart showing the process of retrieving an image in accordance with one embodiment of the invention.

DETAILED DESCRIPTION OF THE INVENTION

Hereinafter, aspects of a workflow system in accordance with various embodiments of the invention will be described. As used herein, any term in the singular may be interpreted to be in the plural, and alternatively, any term in the plural may be interpreted to be in the singular.

The foregoing description of various products, methods, or apparatus and their attendant disadvantages described in the in the "Background of the Invention" is in no way intended to limit the scope of the invention, or to imply that the invention does not include some or all of the various elements of known products, methods, and/or apparatus in one form or another. Indeed, various embodiments of the invention may be capable of overcoming some of the disadvantages of known products, methods, and apparatus while still retaining some or all of the various elements of known products, methods, and apparatus in one form or another.

The systems and methods of the invention provide the technical effect of providing the automated processing of a financial application and enhanced ability to access images associated with that processing.

Figure 1:
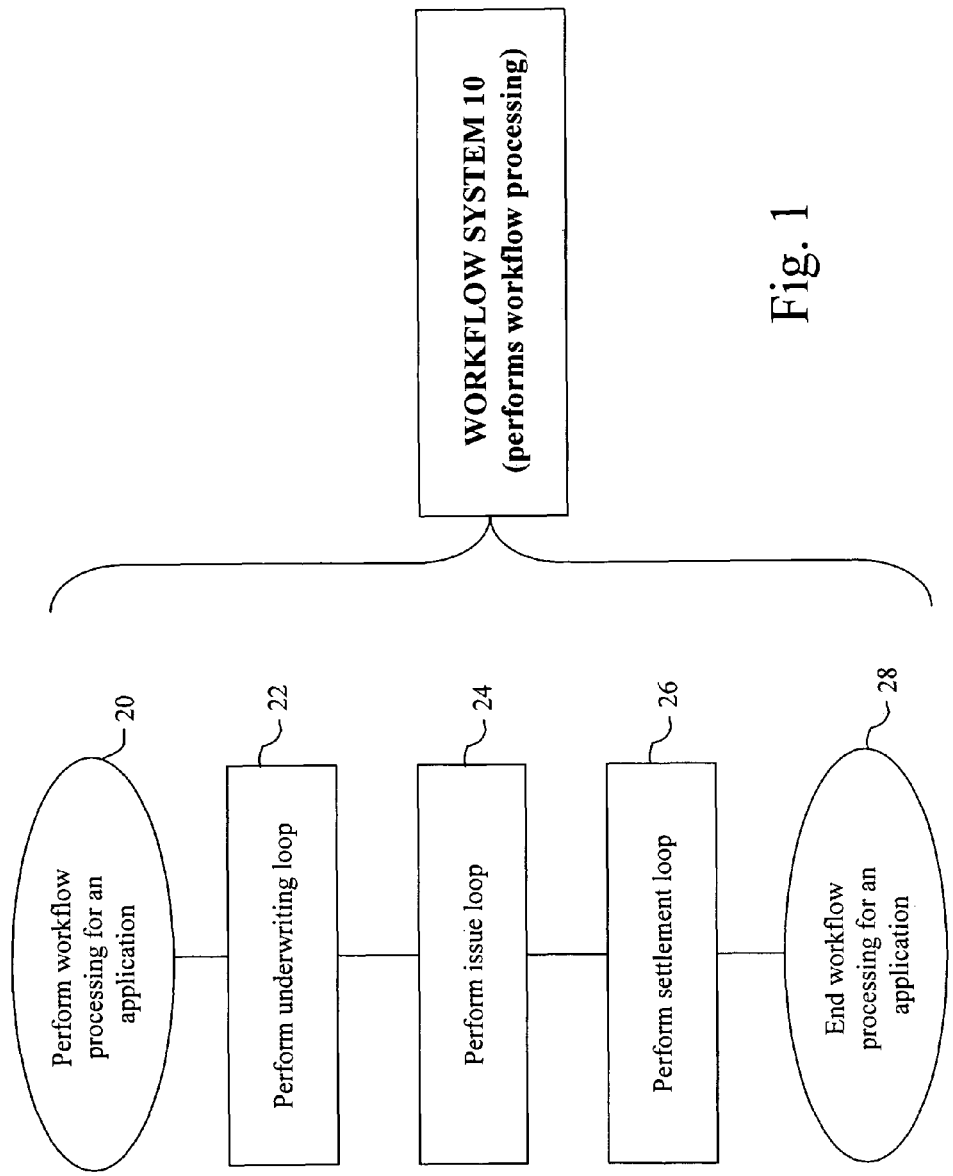
FIG. 1 is a high level diagram showing a workflow system with workflow processing in accordance with one embodiment of the invention.

The systems and methods of the invention are directed to what might be characterized as an automated end-to-end case workflow system 100. FIG. 1 is a block diagram showing the workflow system 10 in conjunction with a workflow process 20 in accordance with one embodiment of the invention. That is, the workflow system 10 is used to perform the workflow process 20. Specifically, the workflow system 10 provides the various tools to perform the workflow processing 20. Illustratively, the workflow process might be used for processing an application.

In accordance with one embodiment of the invention, the workflow processing 20 involves three primary steps, as described further below. As shown in FIG. 1, a first step in the workflow processing is the perform underwriting loop 22. Then, the process passes to the perform issue loop 24. After step 42, the process passes to step 26.

In step 26, the process of FIG. 1 performs a perform settlement loop 26. After step 26, the process passes to step 28. In step 28, the process for the particular application, or other financial product for example, ends. In accordance with one aspect of the invention, the loops (22,24,26) of FIG. 1 are each respectively performed until the particular loop is successfully completed. Accordingly, if some event or the introduction of some document, for example, occurs, such occurrence may re-start processing in a particular loop.

The invention provides an automated system that can incorporate interfaces to multiple systems, including underwriting engines, and provide the automated movement of a case through the process of generating an insurance contract. The end-to-end case workflow system 10 purpose is to provide this functionality without human intervention in processing a substantial portion of cases. However, there are times when human intervention is required. Based on business rules and logic the system will present the case to the user for the required action. Once the required action is completed the case resumes automated processing. Various aspects of this processing are described below.

It should be appreciated that the present invention may be used in conjunction with various other known technology. In particular, the present invention may be used in conjunction with the teachings of U.S. patent application Ser. No. 10/777,634 filed Feb. 13, 2004 entitled METHOD AND SYSTEM FOR ELECTRONICALLY ROUTING AND PROCESSING INFORMATION, which is incorporated herein by reference in its entirety. The Ser. No. 10/777,634 application is directed to a system for efficiently processing information originating from documents having various sources, types and formats, and more specifically to a method and system for facilitating document collection, analyses and processing functions associated with an insurance application process.

Figure 2:
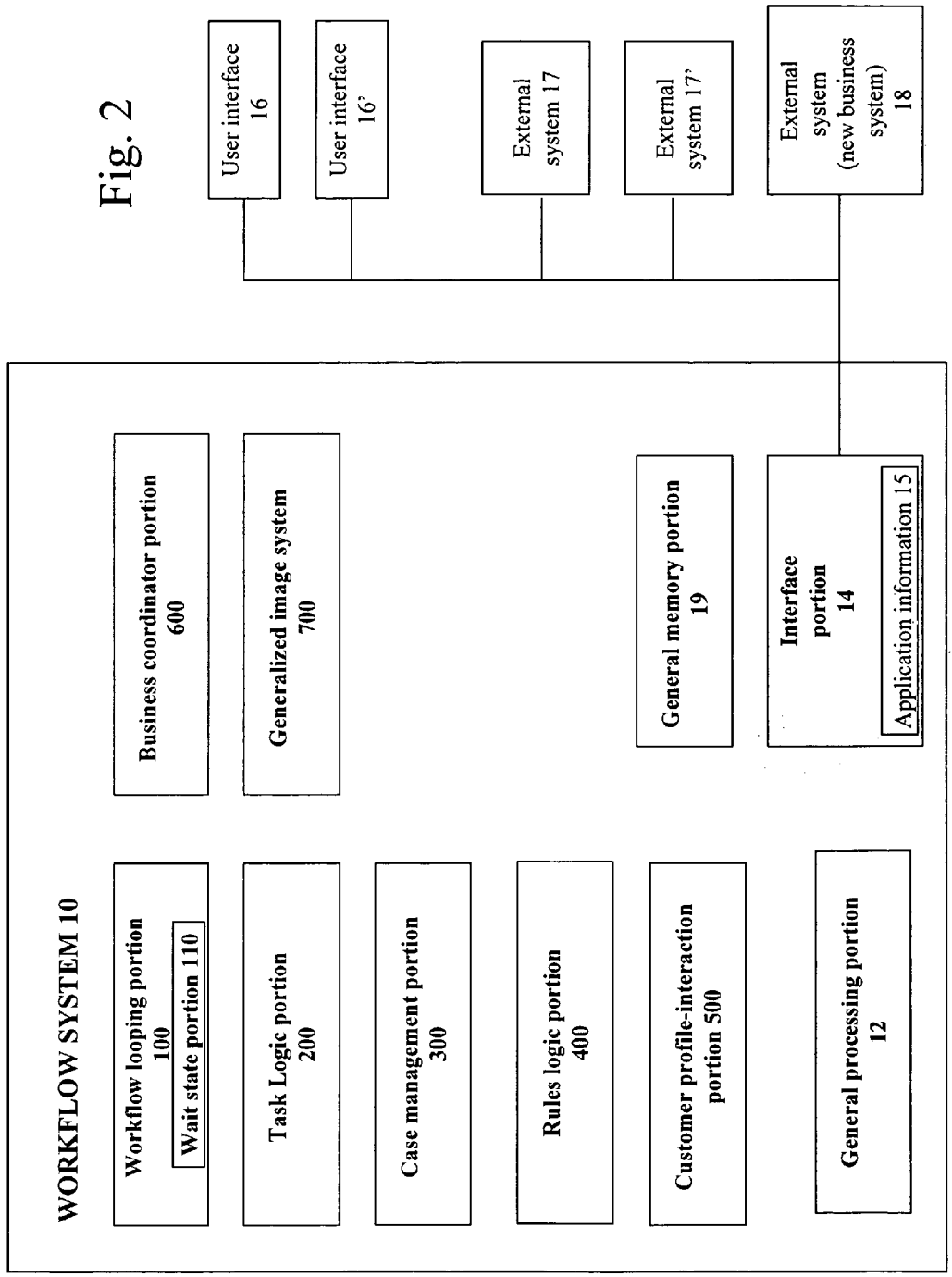
FIG. 2 is a block diagram showing a workflow system in accordance with one embodiment of the invention.

In accordance with one embodiment of the invention, the invention may be described as including a variety of processing portions. FIG. 2 is a block diagram showing the workflow system 10 in further detail. The processing portions of the workflow system 10 include a workflow looping portion 100, a task logic portion 200, a case management portion 300, a rules logic portion 400, and a profile portion 500, as illustrated in FIG. 1. In accordance with some embodiments of the invention, the workflow system 10 may further include a business coordinator portion 600 and a generalized image system 700.

The workflow system 10 also includes a general processing portion 12. The general processing portion 12 handles various miscellaneous processing, not otherwise performed by the workflow system 10, so as to effect operation of the workflow system 10. As shown in FIG. 2, the workflow system 10 includes an interface portion 14. The interface portion 14 provides for interfacing with items and/or systems external to the workflow system 10. For example, the interface portion 14 provides for interfacing with user interfaces (16, 16'), as well as external systems (17,17' and 18). As shown in FIG. 2, the interface portion 14 is used to input application information 15 regarding a particular application, for example.

In addition, the workflow system 10 includes a general memory portion 19. The general memory portion 19 provides for a wide variety of data storage in practice of the invention. Accordingly, the general memory portion 19 may be used by the various operating portions described herein as may be desired. For example, the general memory portion 19 might hold the rules set used to practice the systems and methods of the invention.

Hereinafter, various aspects of these respective processing portions will be described in detail. In accordance with the embodiment of FIG. 2, the workflow system 10 includes a workflow looping portion 100.

Once the initial insurance application is data entered, the workflow system 10 begins the processing of a case. The workflow system 10, and specifically the workflow looping portion 100, attempts to step through the workflow process as described herein. At each step the workflow system 10 will either succeed and move to the next step, hit a condition that requires human intervention and generate a task for a person, or sit in a wait state for more information to be provided from an external source. The workflow looping portion 100 controls the progression through these steps, as well as the handling of wait states in the steps, for example.

At a high level, the workflow system 10 processing workflow has three key areas as noted above. These include the underwriting loop (an iterative, multi-day loop), the issue loop (a 1 day or else loop); and a settlement loop (a 1 day or else loop).

The underwriting loop 22 is the set of business steps or processes necessary to fully underwrite a case and determine the appropriate risk classification and rate class for a case. This loop is very much iterative, due, in particular to new documents arriving that affect the case. As a result the underwriting loop begins again upon a new document arriving that effects the processing of the particular application.

The issue loop 24 is the loop that takes a fully underwritten case and ultimately generates the printed policy to issue to the potential policyholder. All of the steps in this loop must occur within the same calendar day, or the entire process must occur the next workflow system day, in accordance with one embodiment of the invention.

The settlement loop 26 is the loop that takes a fully underwritten and issued case and ultimately places the application/case in force with the appropriate administrative system. All of the steps in this loop must occur within the same calendar day, or the entire process must occur the next workflow system day, in accordance with one embodiment of the invention.

In accordance with one embodiment of the invention, the workflow system 10 utilizes what is herein referred to as "wait states." Wait states are process steps that allow a case to sit dormant while it waits for some event to happen or piece of information to arrive. When a case is in a wait state, a case trigger is the notification to workflow system 10 that an external event has occurred related to a given case, and that case needs to attempt to continue down its automatic path. In accordance with one embodiment of the invention, the workflow looping portion 100 may include a wait state portion 110 that controls operation of the various wait states as described herein.

In accordance with one embodiment of the invention, there are various wait states. In particular, wait states may include (1) validate for underwriting, (2) issue entry, and (3) settlement entry. In the validate for underwriting wait state, the case cannot move ahead in the process because insufficient information is available to attempt to underwrite the case.

A further wait state is the issue entry wait state. In this wait state, the case cannot yet issue because of pending case management related documents or tasks that need to be handled first. This may be true even though underwriting is complete.

Further, a "settlement entry" wait state may be utilized. In this wait state, the case cannot yet settle, and go in force because pending case management, legal or administrative needs that must be handled first. As may be appreciated, various other wait states may be added and used, as may be desired.

Figure 3:
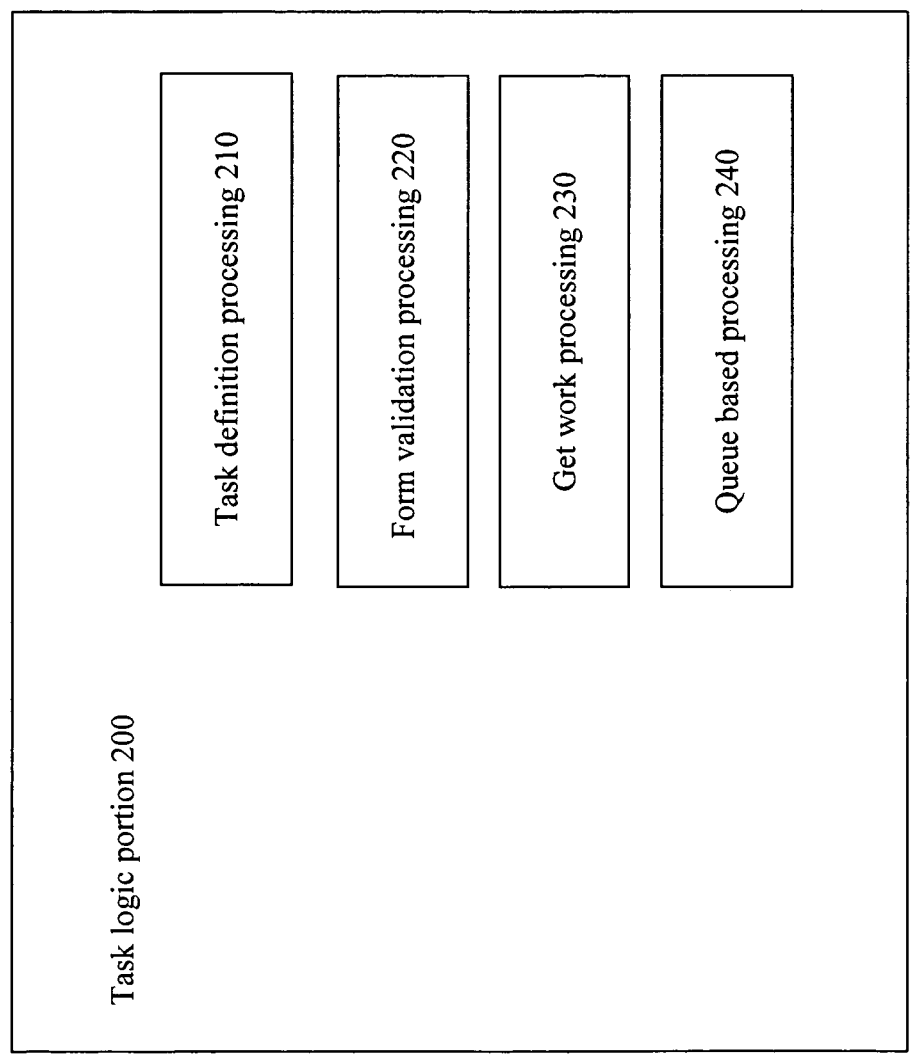
FIG. 3 is a block diagram showing a task logic portion in accordance with one embodiment of the invention.

In accordance with one embodiment of the invention, the workflow system 10 further includes a task logic portion 200, as shown in FIG. 2. The task logic portion 200 is utilized in the situation when the workflow system 10 requires a human person to perform a particular task associated with the processing of the workflow system 10. That is, when the workflow system 10 needs a person to do work, the workflow system 10 needs to create a task for the appropriate person or role. FIG. 3 is a block diagram showing aspects of the task logic portion 200.

In accordance with one embodiment of the invention, the workflow system 10 uses a task definition processing 210. In illustration of the task definitions, FIG. 4 is a table listing particular task definitions vis-à-vis either a case or a document.

As reflected in FIG. 4, cases are used in the processing of the workflow system 10, as well as documents. More specifically, a particular task may be associated with a case in general, as opposed to a particular document used in the processing of that case. On the other hand, the task may well be associated with a particular document. An example of processing required for a case, as opposed to a document, is that a case needs to have the rate class assigned in order to be validated by an underwriter.

FIG. 4 shows that a first category of task is "discrepancy." In this situation, there is an actual problem with the case or document that absolutely requires human intervention. For example, the case or document may be bad, malformed or missing data as an example. Such a deficiency might be associated with the entire case, e.g. the entire insurance application, and/or associated with a single document used in the processing of that case. For example, a discrepancy is present if an application is missing the amount of coverage applied for or the date of birth provided has been scratched through to the point that it is unreadable.

A further category of task is a review task. This task used in the processing of the workflow system 10 mandates that a person should review the case and/or the document to determine if any action is required. If no action is indeed required, the workflow system 10 then closes the task out and allows the case to move on. For example, a "review task" might include review scuba diving activities to determine if there is any increased risk and therefore an increase in premium.

A further category of task is a verify task. A verify task is associated with a particular document. The verify task is associated with the owning role of an application versus a non-owning role. That is, a verify task is given to the owning role of a document, when a non-owning role changes a key document in important places. For example, the medical portion of an application might be the subject of a "verify task." Underwriters own this application part 2, yet exception managers may update information that underwriters care about. Accordingly, further to a change by an exception manager, the particular changed information may be associated with a "verify task", i.e., tagged so as to require review by an underwriter person. For example, a form might be missing the reason for the last visit to the personal care provider. The company requests this information from the applicant and the exception manager enters the data provided into the data collector. Due to this change in information the underwriter is alerted so that they can make the appropriate risk assessment.

A further aspect of processing of the workflow system 10 is task revalidation (or what may be also referred to as "form validation" processing 220). Form validation processing relates to the task types of FIG. 4 and the underwriting loop described herein. In accordance with one embodiment of the invention, whenever a data enterable document is changed or added to a particular case, a process occurs related to that case, i.e., the form validation process.

The primary purpose for form validation is to scrub the appropriate document or documents to insure clean data. Related to tasks however, whenever an form validation is about to occur, the workflow system 10 assumes that all task related to that document(s), and the case as a whole are resolved. Accordingly, tasks associated with that particular document are wiped clean. During the form validation processing the document is again checked for various deficiencies. If the same discrepancies (or new ones) are found, then associated tasks are regenerated for people to work.

In association with the various features described herein, the workflow system 10 further provides includes "get work" processing 230, as characterized herein, in accordance with one embodiment of the invention. The get work processing alerts a user to cases or particular tasks that have been assigned to the user. As used herein, "work item" means a case, task or other item that requires a user to process.

The get work processing to handle work items is handled by the task logic portion 200. Using a suitable user interface, a user may select a "get work" button. Upon the user selecting the "get work" button, the workflow system 10 looks in the workflow system 10 for work items associated with that particular user. This looking may be performed based upon user identification criteria, user role, and/or whether a particular case is assigned to the user. Further, the association between a user and work items for that user may be tied to task types, team assignments, and/or other business conditions. For example, an exception manager would only receive cases that have tasks deemed to be ones that an exception manager can address.

In addition to, or in alternative to, the "get work" processing described above, the workflow system 10 may also use what is herein characterized as "queue based" assignment of work items 240, such as tasks or assignments. In using queue based processing, the workflow system 10 generates information regarding a particular work item. This work item information is then placed into a queue associated with a particular user. The user may then access his or her queue to check which work items have been assigned to them.

In accordance with another aspect of the invention, the workflow system 10 of FIG. 2 also includes a case management portion 300. The case management portion 300 controls the routing of cases to the appropriate case management/underwriting systems. This routing can happen at any suitable time in the process. For example, such routing can happen at document arrival or after data entry and processing of document information.

To explain further, the workflow system 10 of FIG. 1 (and as described herein) may interface with or include further systems (17, 18) that are used in the processing of cases, e.g., insurance applications. Such further systems may, for example, be specialized systems that perform specialized processing associated with the processing of an application. Any number of further, specialized systems might be used based on product line factors, for example, or other factors.

The case management portion 300 controls the routing of cases to these various systems that may be included in or interface with the workflow system 10. Further, the case management portion 300, in accordance with one embodiment of the invention, monitors the processing of cases in and by these specialized systems so as to obtain and retain status information about a particular case. Accordingly, the workflow system 10 provides across systems case status viewing allowing people and systems to determine basic case status from one place, i.e., from one system to another. Further, in accordance with one embodiment of the invention, a user may manually transfer a case from one system to another system if such is desired. This might occur in the situation where it is manually determined that processing by a particular system is not required, but processing by another system is required.

As processing of a case in the workflow system 10 is completed, the case management portion 300 may output the case to an appropriate administration system. That is, the workflow system 10, as described herein, provides the ability to fully process a case up through underwriting and issuance, to the point of placing the case in-force. At such time, the case management portion 300 automatically sends the case to chosen administrative system. Thereafter, the administrative system maintains the case through its life.

Figure 5:
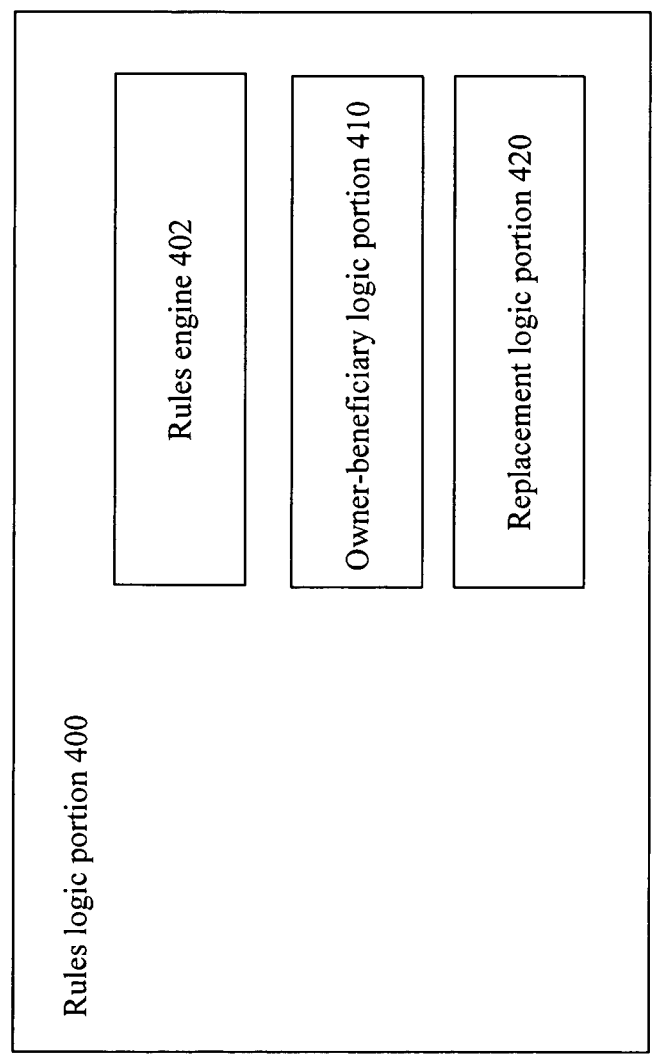
FIG. 5 is a table showing a rules logic portion in accordance with one embodiment of the invention.

The workflow system 10 performs a wide variety of processing for a particular case, e.g., insurance application. In particular, the workflow system 10 can successfully process a life insurance application without human intervention due largely to its ability to perform actions upon a case. These actions are coded as "rules" in a massive rules "engine". In accordance with one embodiment of the invention, these rules that are used in the processing of the workflow system 10 are implemented by the rules logic portion 400. That is, as shown in FIG. 5, the rules logic portion 400 includes a rules engine 402. Using these rules, the workflow system 10 effectively replicates actions and decisions that a human processor would have made, thereby removing the human user from the process for the most part. For example, it is noted that some of the most difficult decisions concern the proper wording of owner and beneficiary designations and the handling of replacement policies to comply with complex state regulations. These regulations typically vary by state.

Hereinafter, further aspects of the rules logic of the workflow system 10 will be described relating to owner/beneficiary wording logic. Processing of owner/beneficiary wording logic is performed by the owner-beneficiary logic portion 410 in the rules logic portion 400, as shown in FIG. 5. It is fully appreciated that proper designation of an owner and beneficiary on a life insurance policy is absolutely crucial, for obvious reasons. This information is of course collected from the owner of the policy, for example, at some point in the processing of the workflow system 10, and typically, in initial processing, as would be expected. In accordance with one embodiment of the invention, the workflow system 10 uses a form to collect owner/beneficiary information, in conjunction with the collection of other information. In particular, such information may be solicited in a free-text box. Consequently, applicants submit this information in a variety of formats and varying degrees of accuracy.

Figure 6:
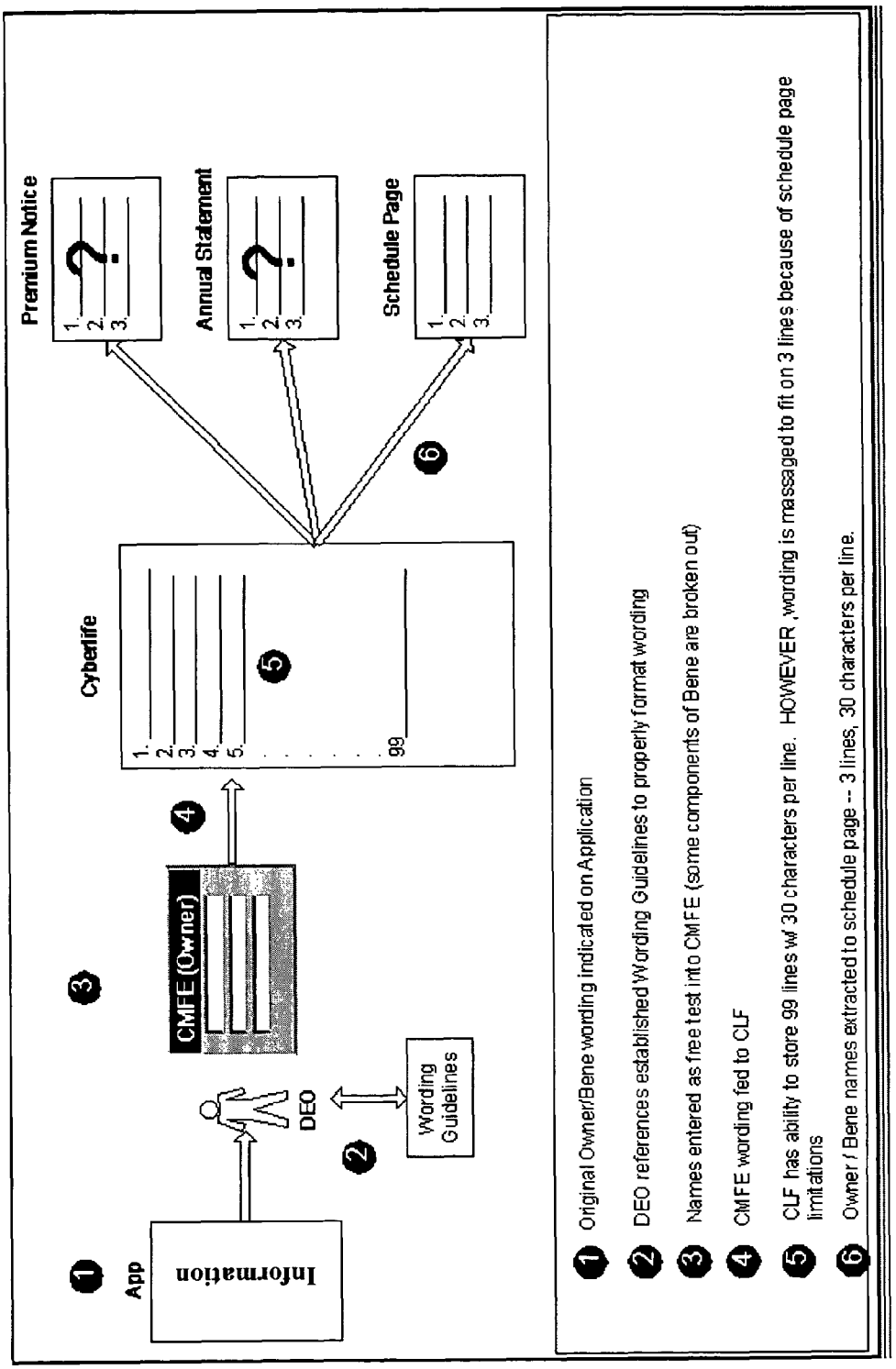
FIG. 6 is a diagram showing aspects of owner/beneficiary logic.

To effect data entry of such owner/beneficiary logic, systems were previously used (prior to the present invention) in which a data entry operator (DEO) selected what they believed to be a correct "template." The data entry operator would then interpret the application information to ensure that the application information was entered in an accurate and legally-acceptable rendering. FIG. 6 is illustrative of this prior processing. In development of the present invention, analysis of past cases showed a significant error rate in this translation performed by the data entry operator.

In contrast to this prior processing, the present workflow system 10 removes need for interpretation by the data entry operator. In particular, the present invention addresses the fact that there are various owner/beneficiary designations, and associated therewith, are multiple acceptable formats for the various designations. Such processing is performed by the owner-beneficiary logic portion 410 in the workflow system 10.

Figure 7:
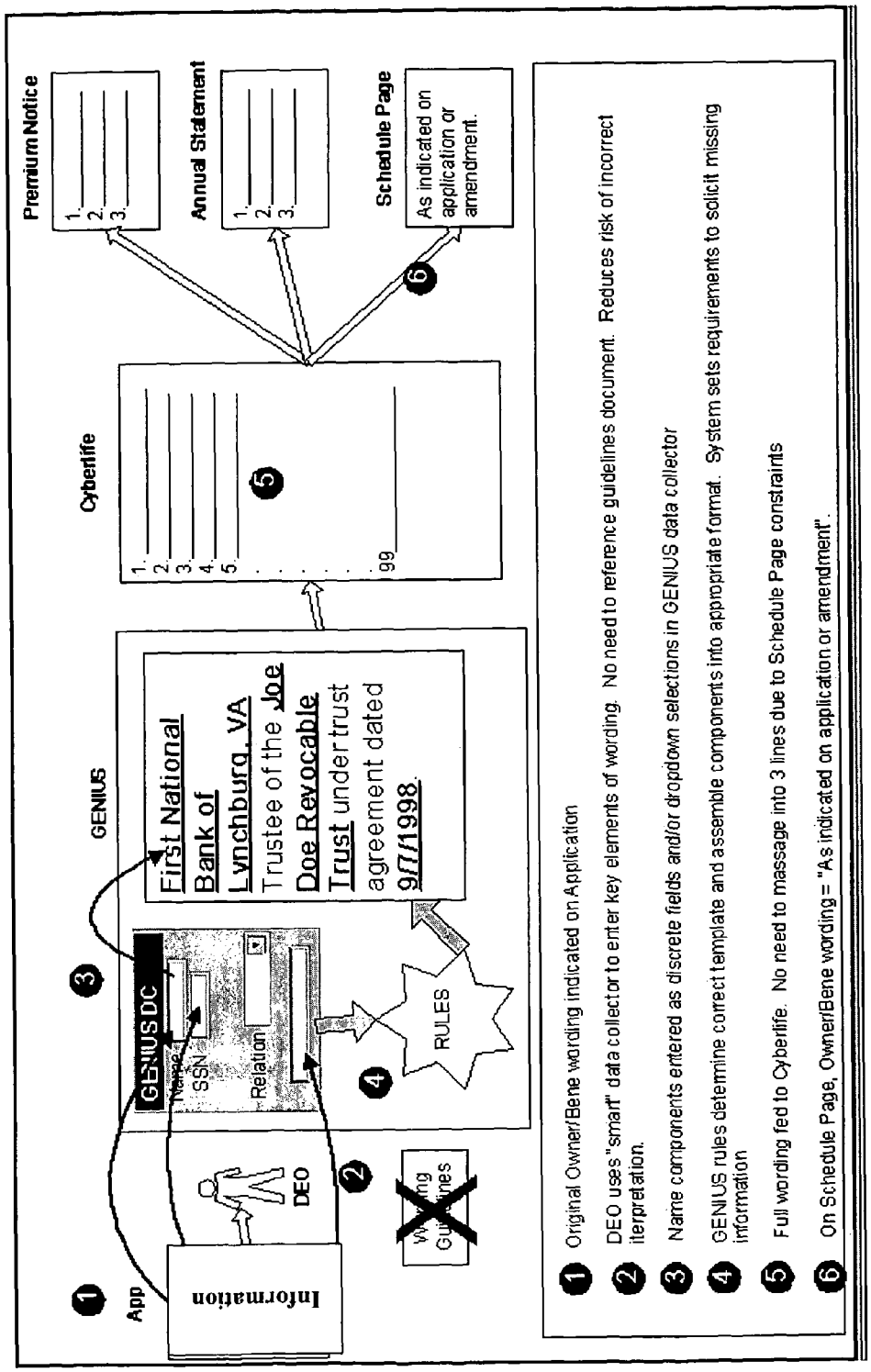
FIG. 7 is a diagram showing aspects of owner/beneficiary logic in accordance with one embodiment of the invention.
Figure 8:
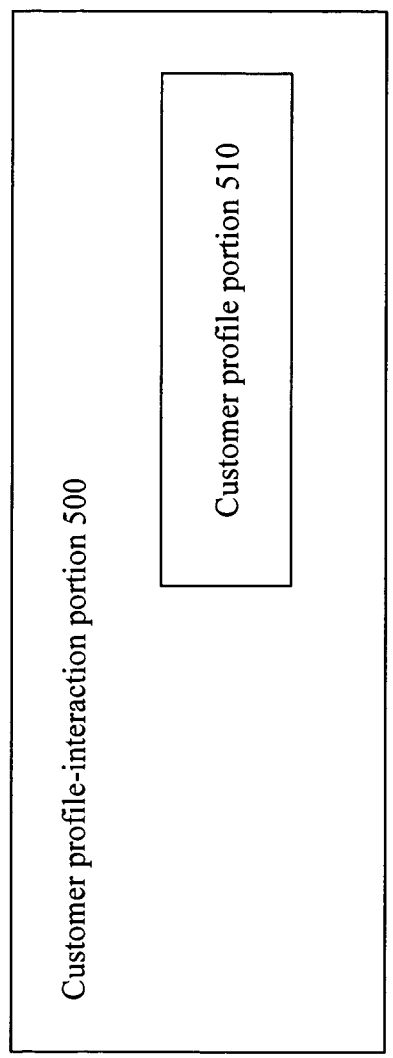
FIG. 8 is a diagram showing a customer profile-interaction portion in accordance with one embodiment of the invention.

The owner-beneficiary logic portion 410 contains a series of templates for each type of designation, i.e., such as individual, trust, or estate, for example. In operation, the owner-beneficiary logic portion 410 prompts the data entry operator to enter some basic information about the TYPE of owner or beneficiary. The owner-beneficiary logic portion 410 then progressively walks the data entry operator through the correct template (which the owner-beneficiary logic portion 410 selected based on the basic information. This correct template contains the proper "fixed" wording for the corresponding designation and solicits the Data Entry Operator for the "variable" wording only. Missing or conflicting information is identified by the owner-beneficiary logic portion 410 and is handled as a "requirement" without the need for human intervention. FIG. 7 is a flowchart showing aspects of this processing performed by the owner-beneficiary logic portion 410.

The result of the processing of the owner-beneficiary logic portion 410 is a legally acceptable, fully compliant designation for owners and beneficiaries which has substantially reduced error rates and virtually eliminates interpretation by data entry operator. As illustrated above, this information is output to suitable processing system, either within or interfaced with the workflow system 10 that all necessary correspondence is properly populated.

In accordance with one embodiment of the invention, the rules logic portion 400 also includes a replacement logic portion 420. In explanation of the replacement logic portion 420, it is appreciated that one of the more complicated facets of life insurance processing is the correct handling of applications that are to replace existing insurance. In the processing of insurance applications, over half of such business may fall into the area of replacing existing insurance. This includes the replacement of existing company policies for another company policy (internal replacement) as well as the replacement of other companies' policies with a new company policy (external replacement).

States may follow an applicable "replacement protocol." For example, many states follow the NAIC replacement model. However, many states still maintain separate requirements, each of which must be met within an allowable timeframe in processing of a replacement application. That is, because insurance is still regulated at the state level, each state insurance commission requires somewhat different handling of replacement policies. The result is a complex and convoluted mix of tedious regulations requiring substantial processing effort.

In accordance with one embodiment of the invention, the workflow system 10 successfully codifies most replacement processing and takes into account all various state regulations. This complex code solicits inputs from the data collectors and runs rules against that data to ascertain the type of replacement indicated. Based on the "type" of replacement, the system identifies specific state requirements by referencing a series of multi-level, or "3-D" tables. These user-maintained tables provide the system with the latest replacement regulations for each state. The rules engine 402 then automatically processes this information and takes the necessary workflow actions. Based on the replacement type, the workflow system 10 automatically sends, for example, Replacement Co-notices and policy summaries (when required) within the state-dictated timeframes. Additional actions include the setting of a "nag clock" to ensure that required documentation is received within the allotted time and automatic follow-up for missing information. This automation significantly reduces an insurance company's exposure to compliance violations by ensuring the timely and accurate processing of this information and is a key element in the workflow system 10's ability to process a case touch-free, in accordance with one embodiment of the invention.

In accordance with one embodiment of the invention, the workflow system 10 further includes a customer profile-interaction portion 500, shown in further detail in Fig. The customer profile-interaction portion 500 enhances the ability of the workflow system 10 to interact with customers automatically. That is, as the workflow system 10 effects the process of FIG. 1, the workflow system 10 interacts with the customer automatically.

To explain, it should be appreciated that an insurance business may well be built over the years on personal relationships. The workflow system 10, while attempting to standardize and automate processing as much as possible, is also flexible enough to accommodate specific customer preferences. The customer profile-interaction portion 500 includes or interfaces with a customer profile portion 510 that contains a profile of each customer. This profile specifies each customer's specific processing preferences. These processing preferences might include contact information, email address, preferred method of communication, frequency of communication, channel code, types of communications desired, mailing preferences, preferred nag intervals, as well as other parameters associated with customer contact.

In the processing of workflow system 10, the workflow system 10 will from time to time need to interact with a customer. This situation triggers operation of the customer profile-interaction portion 500. Specifically, the customer profile-interaction portion 500 is accessed by the workflow system 10 to retrieve information regarding how and when that interaction with a customer should occur. The customer profiles in the customer profile portion 510 are fully editable and maintainable by suitable persons, who may be given access as desired.

Described above are various aspects of operation of the workflow system 10. The workflow system 10 may further include what is herein characterized as a business coordinator portion 600. The business coordinator portion 600, in particular, is included in the workflow system 10 to provide flexibility in coordinating, tracking, and processing as much of an insurance company's new business cases (e.g., applications) as possible, immediately upon introduction. Also, when new insurance products are introduced to the insurance company, immediate, yet limited, benefits need to be realized in automating the coordination of these products. The business coordinator portion 600 assists in this needed processing of the workflow system 10.

In further explanation of the operation of the business coordinator portion 600, in many insurance companies, different products require different business processes, and at least initially, different computer processing systems. Reasons for this include different insurance regulations, company mergers and more. Requiring different computer processing systems poses an organizational nightmare in a company. This is especially true in trying to track different insurance requests in all of these systems. It is also difficult to match new documents and other information to the right applicants and applications when applications span all of these systems. Operation of the business coordinator portion 600 addresses these issues, and provides time to merge processes and systems, if and when necessary. Accordingly, the business coordinator portion 600 enhances operation of insurance and other financial services and products that require information from multiple sources, and in financial industries where multiple new business processing systems are commonplace.

Figure 9:
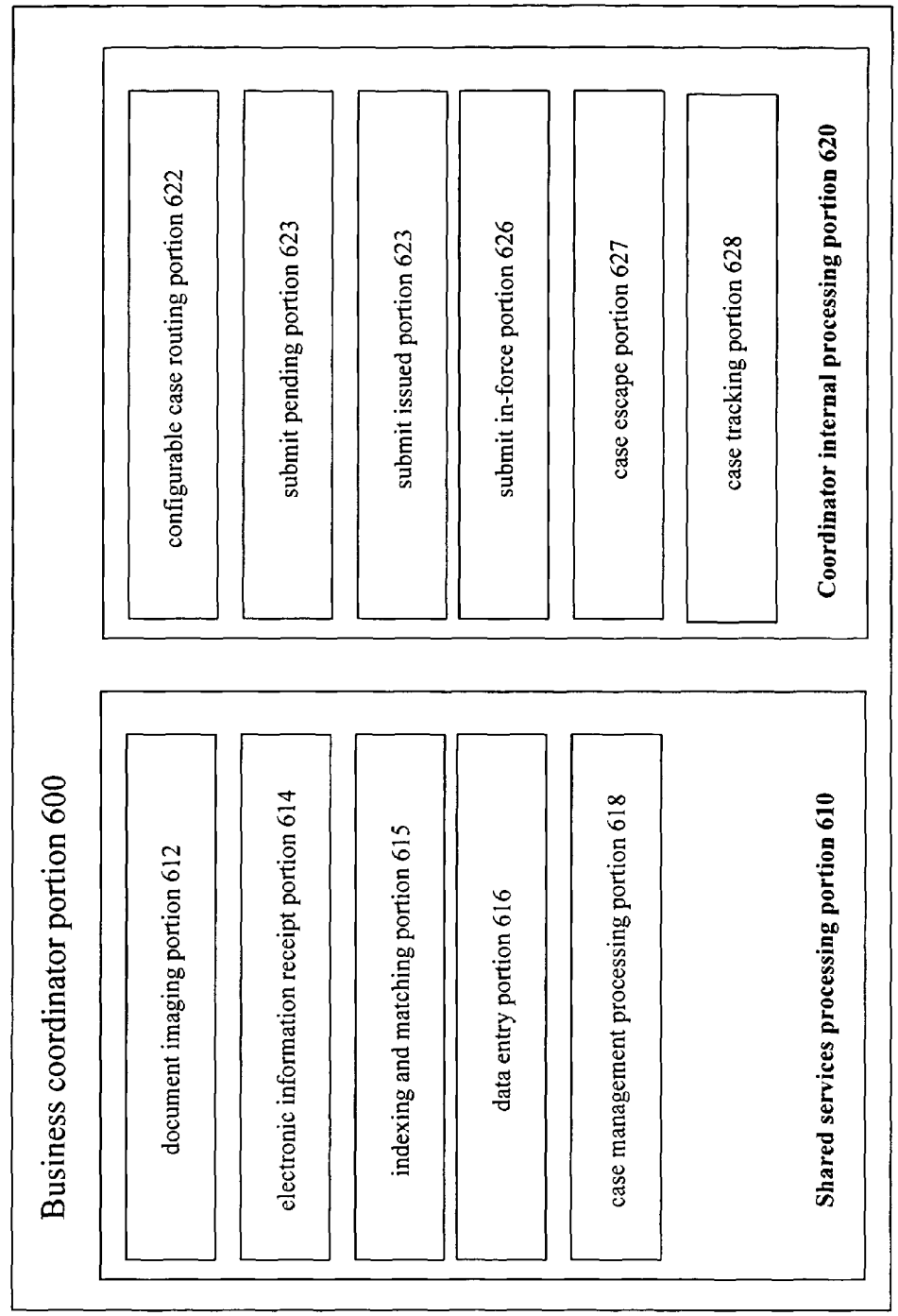
FIG. 9 is a diagram showing a business coordinator portion in accordance with one embodiment of the invention.

In accordance with one embodiment of the invention, the business coordinator portion 600 includes a variety of portions that provide for a variety of features. As shown in FIG. 9, the business coordinator portion 600 includes what is herein characterized as a shared services processing portion 610 and a coordinator internal processing portion 620. The shared services processing portion 610 provides for processing that benefits not only operation of the business coordinator portion 600, but also operation of other processing in the workflow system 10.

For example, the shared services processing portion 610 includes a document imaging portion 612, in accordance with one embodiment of the invention. The document imaging portion 612 is a document imaging system that reduces manual paper handling of insurance requests. Further, the document imaging portion 612 provides for long term archival of information. This processing benefits numerous processing portions across the workflow system 10 in that a document may be input and effectively manipulated in the workflow system 10 using the document imaging portion 612.

Further, the shared services processing portion 610 also includes an electronic information receipt portion 614. The electronic information receipt portion 614 provides for the ability to receive information electronically, as well as through standard mail, packages, etc., for example. Accordingly, the electronic information receipt portion 614 allows for significant improvements in automation.

The shared services processing portion 610 further includes an indexing and matching portion 615. In accordance with one embodiment of the invention, the indexing and matching portion 615 is important for coordination between different processing portions in the workflow system 10. That is, as any information arrives that is intended for new business processing, a key problem occurs in trying to identify the document type and the person/application that the information is related to. The problem is significant if separate new business systems handle their indexing and matching on their own. Instead, the indexing and matching portion 615 is in place to handle ALL indexing and matching for ALL new business systems.

The shared services processing portion 610 further includes a data entry portion 616. The data entry portion 616 monitors entry of data into the workflow system 10. As key information is associated with an insurance request or case, that information may need to be electronically or manually 'data entered' in order for automatic business rules to process that information. This 'data entry' can be useful for determining which system a case needs to go to, and it can be useful for directly handling the case management and underwriting of the case, especially when the designated underwriting system is heavily automated.

As noted above, "key" information may be associated with an insurance request or case. That is, it is appreciated that various information may come into the workflow system 10 in various manners, e.g., electronically or a paper submission such as e-mails or phone calls. In accordance with one embodiment of the invention, such information is reviewed either electronically or by a person to determine if any information in the submission is "key", i.e., of sufficient importance such that the identified key information will be entered in the workflow system 10. Such key information may well affect processing of an application in one of the loops. For example, such information might result in the underwriting process, i.e., the loop, being started over. Accordingly, it is appreciated that of course not all information will be entered into the workflow system 10 so as to affect processing of an application in the workflow system 10, i.e., information that does not affect underwriting. This decisioning logic is based on the rules at work in the workflow system 10.

As a further note, in accordance with one embodiment of the invention, a loop, e.g., the underwriting loop, once information such a document is input into the workflow system 10, the loop may be fully restarted. Alternatively, a decision process may be implemented upon such new information coming into the workflow system 10. Based on this decision process, the particular loop may be started over, or alternately, may be started at the point the loop was stopped upon identification of the new information. That is, it may be determined that (based on the information) there is no need to restart the particular loop, such as for example the underwriting loop.

The shared services processing portion 610 further includes a case management processing portion 618. The case management processing portion 618 coordinates operations between the workflow system 10 and other external systems in accordance with one embodiment of the invention. That is, is it appreciated that there are a wide range of cases, e.g., applications, with a correspondingly wide range of processing requirements. A particular application, for example, may be able to be processed fully within the workflow system 10. Alternatively, a particular application may need to involve external processing. That is, if the coordinating system (the workflow system 10) is capable of directly processing an insurance request, then there is no need to involve an external system at all. If however, an insurance request cannot be fully processed directly by the workflow system 10, then the case management processing portion 618 controls the handoff of the insurance request to such external processing system and tracks the application's progress through the external system. It may be that the particular application is processed by the external system and then returned to the workflow system 10 for further processing. Accordingly, in this situation, the case management processing portion 618 coordinates the re-entry of the particular case into the workflow system 10.

As noted above, the business coordinator portion 600 further includes a coordinator internal processing portion 620. The coordinator internal processing portion 620 effects further helpful processing.

In accordance with one embodiment of the invention, the coordinator internal processing portion 620 includes a configurable case routing portion 622. The configurable case routing portion 622 provides for configurable, characteristic driven routing of cases (or items related to cases) to appropriate case management/underwriting systems. The configurable case routing portion 622 provides for decision-making, which might happen at document (or other type of information) arrival, and after data entry and/or interpretation of the information on the document itself. Illustratively, the configurable case routing portion 622 operates upon receipt of the primary insurance application itself, where the application is for a product type that must be routed. A further illustrative example of the configurable case routing portion 622 occurs in the condition where the requested face amount is beyond the limits that have been set by the coordinating system, e.g., the workflow system 10. As a result another system, possibly more manual in nature must be engaged.

The coordinator internal processing portion 620 further includes a submit pending portion 623. The submit pending portion 623 provides a user processing new business (a new business coordinator) with the ability to send a new business application/case that has not yet been underwritten, i.e., a pending case, to another case management and underwriting system. That is, it may be the situation that the new business coordinator comes to identify a particular application that should not be processed by the workflow system 10. The submit pending portion 623 provides the new business coordinator the ability to transfer that application to an external system, outside the workflow system 10, for processing, in accordance with one embodiment of the invention.

The coordinator internal processing portion 620 further includes a submit issued portion 623. The submit issued portion 623 provides a new business coordinator with the ability to send a case that has been fully underwritten and issued to another system that can complete the final processing of the case to include placing the case "in-Force."

Further, the coordinator internal processing portion 620 includes a submit in-force portion 626. The submit in-force portion 626 provides a new business coordinator the ability to send a case that has been fully underwritten, issued, and settled to a policy administration system for policy management.

Further, the coordinator internal processing portion 620 includes a case escape portion 627. The case escape portion 627 provides the ability for a user to manually route a case or application, for example, to another new business system. This ability is especially important when a new product is introduced, a new system is in its infancy, or business rules and processes are in need of change.

Further, the coordinator internal processing portion 620 includes a case tracking portion 628. The case tracking portion 628 is a processing portion that provides the ability to see the status and basic information about a case/application directly from the workflow system 10. This is true regardless of what new business system is truly processing the case at that time. In operation, the case tracking portion 628 performs its processing in various ways. In accordance with one embodiment of the invention, the case tracking portion 628 in the workflow system 10 regularly monitors the other new business systems or other external systems for status, as well as monitors the status of cases in the workflow system 10. In order to allow the case tracking portion 628, the new business systems themselves need to provide regular updates to the coordinator. Alternatively, the case tracking portion 628 is provided with real time access to obtain status information from the other new business systems.

Figure 10:
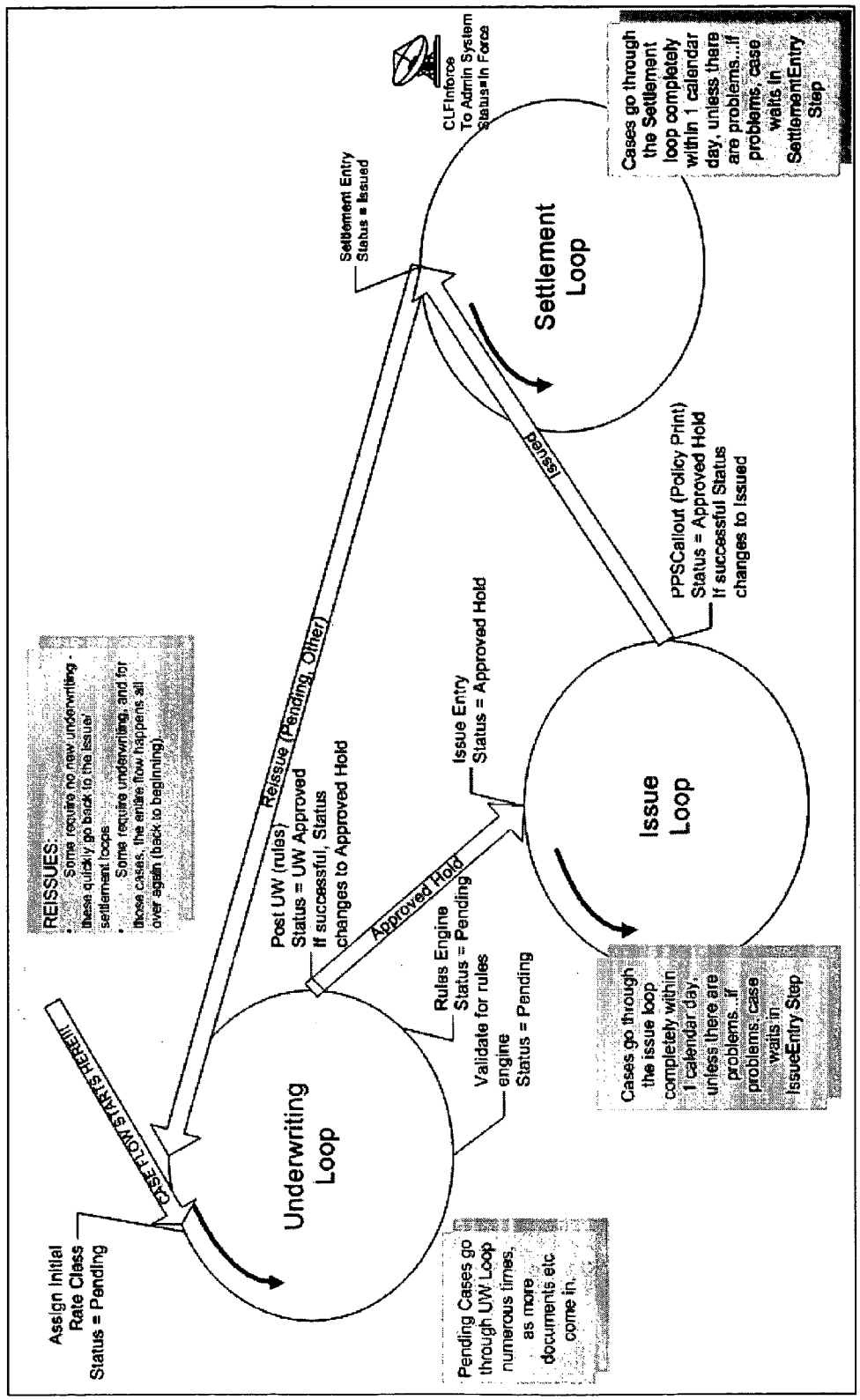
FIG. 10 is a diagram showing further aspects of operation of the workflow system and the business coordinator portion in accordance with one embodiment of the invention.
Figure 11:
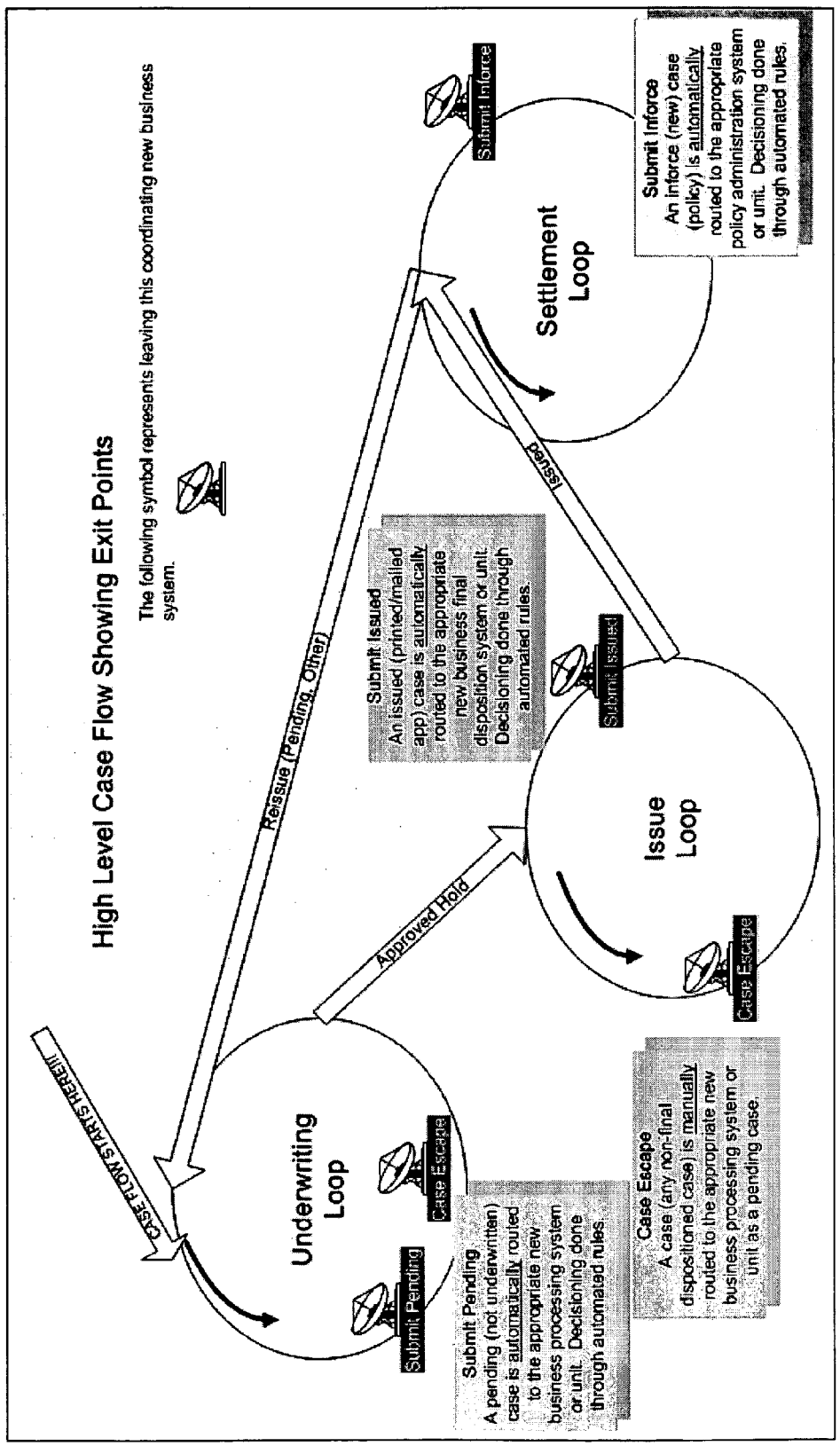
FIG. 11 is a diagram showing yet further aspects of operation of the workflow system and the business coordinator portion in accordance with one embodiment of the invention.

Further to the discussion above, FIG. 10 and FIG. 11 show additional aspects of the operation of the workflow system 10, and in particular operation of the business coordinator portion 600.

In further explanation, FIG. 10 is a high level case flow, in accordance with one embodiment of the invention. This diagram shows high level case flow through a new business system for a common application case. As shown, the process starts with the underwriter loop on the left, beginning at the Assign Initial Rate Class workflow step.

Other than Assign Initial Rate Class (AIRC), the other steps shown are key workflow steps where cases can remain in a wait state for a significant period of time. ARC is the first step for a case, in accordance with one embodiment of the invention.

Whenever a document arrives and is validated for a case, that case (most of the time) gets sent back to the very beginning of the underwriting loop. This is constantly true for a case, until the case goes to approved hold. At that point, the case is considered 'frozen' from a data and underwriting point of view, in accordance with one embodiment of the invention.

In accordance with further aspects of the invention, FIG. 11 shows high level case flow showing exit points. That is, FIG. 11 shows high level case flow through a new business system, and shows the different places where a case, i.e., an application for example, could leave the coordinating system, to arrive at another new business system for processing.

In addition to these outputs, the coordinating system also fetches or receives constant case statuses or updates in order to provide a comprehensive view of case statuses throughout new business processing. Accordingly, FIG. 11 shows that the workflow system 10 may be used with various other processing systems in the processing of a particular application.

Hereinafter, further aspects of the present inventions will be described with regard to the processing of images in the workflow system 10. As should be appreciated, a wide variety of images are used in operation of the workflow system 10. As shown in FIG. 2, the workflow system 10 includes a generalized image system 700, in accordance with one embodiment of the invention.

The generalized image system 700 is used to isolate users of a critical system process from the underlying image storage and retrieval process typically handled directly between a client and the server. By performing this processing, the workflow system 10 is provided with a more flexible system where a user is unaware of the underlying implementation. Accordingly, making changes or bridging gaps between systems and their implementation can be done seamlessly to the users. The generalized image system 700 as described below, further provides the ability to distribute information to different localities and access the data even when the underlying system may be down, i.e., such as for regular or emergency maintenance.

In development of the generalized image system 700, various needs may be addressed. In accordance with one aspect of the invention, a first need is to be able to interface different image systems. For example, a company might generate a newly written custom business application which is interfaced with an underlying image system. Further, it might be the situation that the underlying image system is anticipated to be replaced in some short period of time. In such a situation, it may be desired to insure that the image interface layer (between the new and old systems) is focused enough to meet all the business viewing and retrieval needs and yet extensible enough to make swapping out the underlying image system trivial and transparent to the end users and backend processes.

Relatedly, a further potential need may be focused around a situation where few clients are capable of displaying the image format generated as a result of scanning. The generalized image system 700 allows the translation of a variety of image formats being stored into a single output format so that a common viewer may be used to display the image content to the users. This arrangement de-couples the various users from the input format and allows for a controlled output format to be used.

A third need may revolve around physical locality. In operation of a company, for example, a portion of the work may be done at distant facilities, eg an offshore facility. Users at these distant faculties need to view documents in the workflow system 10 in the normal business routine. Due to the size of these images it may be a better performance option to distribute a subset of images that these users would need in their own geographic location. Relatedly, a storage solution may be provided that could store locally a subset of images. Furthermore, it is appreciated that an offshore group may work during hours when a particular system is down for nightly backup, yet they still needed access to the images.

A fourth need addressed by the generalized image system 700 described herein is the need to develop a bridge between the business workflow system developed and the images necessary to perform the work. This bridge may require the detection of new images and the mapping of these into a system which would understand how to route them to the appropriate work.

A fifth need addressed by the generalized image system 700 relates to a situation where there is a time period where both a local system and an offshore system is are active at the same time. This requires an image system which is capable of abstracting to a level where the requesting processes do not know or care about which of these underlying system may contain the content being requested.

Hereinafter, various terminology will be described below so as to assist in the description of the generalized image system 700. An image may be considered to be both the content in an image and the properties about the image vital to display. This may include such things as the image system, a native identifier in that system, number of pages in the image, etc. for example. Images may also be referred to as documents.

An image system, such as the image system 700, means a system that handles the storage and retrieval of images. Such a system provides indefinite archiving capabilities for these images (limited only by space—and often allowing for removable, swappable mediums thus eliminating these space limitations). These systems may also provide other interfaces for scanning and otherwise committing new documents.

In accordance with one embodiment of the invention the generalized image system 700 in essence abstracts an image system without implementing the underlying long-term archival capabilities and without providing any kind of scanner or committal interface usually associated with such a system.

An image format may be understood to mean how the image is wrapped up and compressed for storage. A variety of different compression formats and wrappers can be used by any given image system. It is appreciated that in practice of the invention, the image format must be understood to be able to turn the image back into something that is displayable.

The generalized image system 700 responds to image requests. A client may request all or part of an image's content or its properties, depending on the need. Image requests may fall into one of two different methods of access. As described below, an image may be requested directly from the generalized image system via a "bean," or are accessed from the generalized image system via HTTP (the protocol web browsers use).

As used herein, a cache is a repository for information about an image. The cache can contain an arbitrary number of items, limited only by storage space. Items in a cache can be accessed without referring to the original image system at all. As a verb, cache may refer to the action of committing or writing items into a cache repository.

A workflow system is a system which provides the necessary business logic to take a task and move the task from beginning to end. For example, a workflow system may include logic whereby a document is moved from indexing through to the policy issue phase.

Further, a poller process is a process where-by one is able to periodically search for items in one system and take action on those items which are found. In the scope of the current implementation such a process may be used to find new documents and introduce the new documents into a workflow system.

The generalized image system 700 as described herein provides a variety of features and benefits associated with those features. FIG. 12 lists various benefits of the generalized image system 700. Further, FIG. 13 is a block diagram showing the architecture of the generalized image system 700 in accordance with one embodiment of the invention. FIG. 13 shows various processing portions that may be used in the practice of the image system, in accordance with one embodiment of the invention. This system is described in detail below. As shown by the arrows in FIG. 13, various components communicate or interface with other components.

In accordance with one aspect of the invention, the generalized image system 700 abstracts an underlying image system and provides capabilities to provide common interface for systems, i.e., for viewing by a user. To explain, the generalized image system 700 provides a common abstraction layer over the typical image system functionality necessary for a client o retrieve information. By developing this layer of abstraction it is possible to provide a common interface and develop clients around a known architecture without worrying about how things may change in the future, or even what image system or systems may be providing your content. As a result one can build a variety of clients to interface with this abstract layer and changing the underlying system only requires updates in a centralized area, i.e., the centralized area of the change. Once one has completed writing the necessary code to plug the new system into the abstraction layer, all the other clients will be able to interface with it immediately.

Further, it should be appreciated that the capability provided by the generalized image system 700 as described herein goes beyond the other clients not having to do work to interface with a new system. That is, other clients and systems accessing images actually remain unaware that there has even been a system change or a new system. They are treating the abstraction layer as their image system and the fact that the underlying image systems have changed is never translated up to a layer where they become aware.

The generalized image system 700 also adds diverse geographic caching abilities to any image system. To explain, it should be noted that an image system may not have functionality built in to be able to replicate their data to different machines or different locations. The generalized image system 700 adds this capability to any image system that it abstracts. Caching can be done in various ways (configurable at run-time by a suitable set of parameters), in accordance with one embodiment of the invention. A peer cache will contain all the images sent to its master. At some level you must supply a main cache; however if you implement cache triggering at the poller level, you may actually have a variety of different main caches for each poller purpose. In this sense you may take any set of images and distribute them among sites in whatever manner is needed.

In accordance with one embodiment of the invention, the generalized image system 700 also provides for independent cache subsets which may be specified. When a request is made to a server running a cache manager service, using the invention, one may choose to push only certain images to another set of servers. Typically these images are a subset of the main cache. However, it is appreciated that any desired image my be pushed to a further server or a set of servers.

In short, the generalized image system 700 allows a user to establish an appropriate configuration as desired. Accordingly, the generalized image system 700 allows a user, by suitably configuring the generalized image system 700, to cache any set of images in any location that the user needs such images. That is, in accordance with one embodiment of the invention, one only needs to provide a poller process to initiate cache requests to the appropriate cache managers, i.e., some controlling process needs to be provided to effect a polling process and the interaction of such with respective caches.

The generalized image system 700 further provides for translation of requested formats on the fly for viewing by the requesting user. As is appreciated, the decoding and encoding of image formats is not a new concept. Further, it is noted that in order to develop a viable image format one must provide methods for doing both coding and decoding. Further, the decoding will generally be public knowledge.

However, above and beyond known coding and decoding, the generalized image system 700 of the invention provides functionality to translate from one format to another during the retrieval process. This ability enables the client to expect a particular format and access/view the generalized image system 700 as though the generalized image system 700 only presents in that particular format. This can greatly ease the implementation of a client since one does not have to worry about what image formats may be used in the system. The generalized image system 700 also abstracts images retrieved from storage, in accordance with one embodiment of the invention. Accordingly, should the format of the stored image be changed, the client doesn't need to know (or be re-developed) to address the change in the underlying image.

It is appreciated that known of-the-shelf products may be used to perform the image decoding and encoding in the generalized image system 700. For example, SnowBound's RasterMaster may be used. However, it is appreciated that the decoding/encoding software might be viewed simply as an enabling piece. Accordingly, various other products might be used to effect the encoding and decoding, or a custom written set of image decoding/encoding utilities might be utilized. Accordingly, the invention provides a coding/decoding system in an image system to normalize the output of the image system.

The generalized image system 700 may further be used to create a bridge between an image system(s) and a business workflow system. To explain, a poller process is a means by which one may create a bridge between two different systems. The image system specifically makes it possible via a set of functions to create a poller process which can translate the incoming set of documents into a useful business workflow system.

Without such a feature each system interfacing with the image system would need to implement all the functionality necessary to retrieve work directly and then create appropriate tasks. With the abstraction layer creating a polling interface which is independent of the underlying image system it is possible to do this from a centralized place.

This abstraction layer also makes it possible to change to another image system, or even add an additional image system(s) to feed into the same workflow. With this ability sources may be added, taken away, or changed without any modification to the particular workflow system.

The generalized image system 700 further allows for multiple image systems to be accessed from a single process. As mentioned, it is possible for the system to support multiple image systems at the same time. Since the generalized image system provides its own identifiers for use by the client, there is no direct tie from client to the underlying image system.

All translation and content retrieval is done internal to the generalized image system. Because of this it is possible to have a client pull data from a variety of enabled sources without worrying about which system contains the needed data. Clients simply make a request and the appropriate image is retrieved from whatever system contains the content. Clients don't need to be written to understand several systems or have any kind of fallback retrieval order—they can just worry about interfacing with the generalized system.

Further, the generalized image system 700 allows for new image systems to be plugged into existing architecture, transparent to the client systems. It is possible to create a new plug-in into the existing architecture to enable a completely new kind of image server, without any client modification to begin retrieving the new system's content. All the necessary changes are internal to the abstraction layer to support a new system. Clients continue to access their content the same way, and receive the same results, before and after the new system is added. Content from the new system will also continue to be presented in the same way as content from the other enabled systems.

Further, the generalized image system 700 allows for multiple types of clients to access all available data (since data that client may not be able to understand is translated into its native format). Since the generalized image system 700 provides the ability to normalize the output to a known format, it is possible to change to a format that any given client can understand. This means that one can choose any viewer that best meets business needs, or even create a custom viewer, and normalize the output for compatibility with that viewer.

It is further enabled by the generalized image system 700 to create multiple access routes into the system, so that one can have a variety of viewers each accessing the system and receiving data in their native format. This gives businesses the flexibility to select viewing clients on what best meets their business needs and not worry about the formats. A good example of this is PDF. Acrobat reader is a popular viewer and many understand its feature set well. If we desire to use Acrobat, we simply translate all output data to PDF. At the same time we can utilize a custom viewer which provides functionality tailored to our business to view the same content.

Further, the generalized image system 700 allows for access of some data even when image system is down, i.e., provided that the data to be accessed is cached. It is provided for to take images as they come into the system and cache them to the local or other servers. The generalized image system is configurable on how it reads data from cache, so that one may specify a number of caches to check before falling back on the underlying image system for retrieval. In accordance with one embodiment of the invention, if an image is cached then the underlying image system is never accessed. This means that even if an image system is down (say for nightly maintenance) then the users will be able to retrieve and view their required content.

Further, the workflow looping portion 100 may be used to distribute network load. caching provides the system with the ability to distribute images to different locations, so that the clients in that location do not have to leave their local network. This provides enhanced performance and reduces the overall network load.

A further capability of the generalized image system 700 is that the system can run on independent architectures. The image system might be written in JAVA (a common programming language), utilizing the J2EE standard (JAVA service provider requirements). These standards are capable of running on a variety of architectures, including Linux, Windows, HP-UX, AIX, and Solaris. As a result we are not tied to any particular system for running this image system. The generalized image system can in-fact be run on a completely different platform than the underlying image system requires. This enables us to select the platform we want to have for client and other system access based on our cost and stability needs.

Further, the workflow looping portion 100 may be used to distributes network load. caching provides the system with the ability to distribute images to different locations, so that the clients in that location do not have to leave their local network. This provides enhanced performance and reduces the overall network load.

The generalized image system 700 further provides the ability to cache images to a remote location, and then have that remote location pass on images to caches in other locations. This gives the system further flexibility to control how images are distributed from cache to cache. A properly configured cache system can significantly reduce the amount of network traffic required from site to site.

Hereinafter, an illustrative example is set forth regarding operation of the generalized image system 700. Specifically, a walk-through of an example scenario is provided where the image system provides a successful abstraction of a complex process—to the point where the users had literally no impact from the change. The example relates to changing out an underlying system.

In this example, a business had standardized on using Adobe Acrobat to view image content stored in the image system. At the time the decision was made to use Acrobat, image formats being used in the underlying system (AWD), were MO:DCA, some TIFF, and ASCII text. By using the generalized image system, the users were able to set up an interface which converted all these varying formats to PDF and allowed them to use Acrobat to pull up any image from their underlying image system, AWD.

After about a year the business decided for cost and overall functionality reasons to change out the AWD system and implement a system based on FileNet IS. The change of the image system had the potential to require every business application accessing the image system to be re-written to support the new system. However, in implementation of the invention, a module was written to provide the necessary interface with FileNet. This interface was plugged into the image system abstraction layer and a small amount of code written to be able to enable or disable the plugin at run-time. No code was changed in the poller, the workflow system itself, or any of the viewer clients.

Further, in this example, part of the project involved the conversion of all the data in the old image system (AWD) to the new image system (FileNet). We took these updated image pointers and updated the abstract image system to point to the new images. At this time we also enabled the FileNet system interface in the abstract image system.

Users were successfully able to pull both unconverted AWD images and FileNet images without noticing any service interruption or change in their interface. As the conversion was completed the AWD system plug-in was turned off in the generalized image system.

The workflow system was able to be converted to use FileNet without changing any code in the Genius system or its poller interface to accomplish the task. The system successfully abstracted the underlying implementation without any user interface change or interruption of service.

Hereinafter, various features of the generalized image system 700 will be described with reference to FIG. 13. FIG. 13 is a block diagram showing one embodiment of a generalized image system 1300 in further detail, in accordance with one embodiment of the invention.

The generalized image system 1300 includes various components including image viewing clients (1302, 1304) and an image request handling subsystem 1310. The generalized image system 1300 further includes a system cache manager 1330, an image format handling layer 1320, and a generalized image system data map 1350. As described below, the generalized image system 1300 may utilize a poller process 1390, in accordance with one embodiment of the invention.

Further, as shown in FIG. 13, the generalized image system 1300 includes multiple image system plug-in adapters (1380', 1380", 1380''') that respectively interface with underlying image systems 1370.

In accordance with one embodiment of the invention, an image viewing client (1302, 1304) is any one or more programs designed to initiate a request to the image request handling subsystem (1310) and display desired content. Any number of clients, such as ACROBAT READER, can be wrapped in a request mechanism designed to be able to retrieve the content and pass it back to a helper. In many cases the wrapper will be another third party application such as INTERNET EXPLORER or MOZILLA which is capable of initiating a request to a server for content, then passing the content to the format handler.

The image viewing client (1302, 1304) may also be a custom written application which serves as both the rendering application and/or the request application. In accordance with one embodiment of the invention, an applet has been designed as a component of the generalized image system to serve as a rendering application (in conjunction with any web browser as a request application) should a third party application not be desired.

The image request handling subsystem 1310 is a service provider which will retrieve and request conversion of the content and provide the appropriate data back to the image viewing client (1302, 1304). Either of two scenarios is possible when making an image request. (1) The image is in system cache, or (2) the image is not available in cache. In accordance with one embodiment of the invention, the image request handler will use the following logic as illustrated by the flowchart of FIG. 14 to retrieve content for transport to the image viewing client.

As shown in FIG. 14, the method starts in step 1400 and passes to step 1410. In step 1410, the system cache manager (1330) is asked to check its caches (any of the configured caches 1342, 1344, 1346) for the requested image. If an image and its associated meta-data is available in one of the caches then the data is returned to the request handling subsystem. After step 1410 of FIG. 14, the method passes to step 1420.

In step 1420, if no data is returned from the system cache manager then a request is made to the generalized image adapter layer (1360) for the image content. Aspects of the adapter layer 1360 and how content is retrieved using the adaptor layer are described below.

Then, in step 1430, if no content is returned from either system then an appropriate error message is returned to the client, indicating that the image is either irretrievable or not an image in the system, whichever is appropriate. After step 1430, the process passes to step 1440.

In step 1440, if content is available from either the call in (1410) or (1420), then the image format is checked against the format the viewing client is requesting. If any format conversion needs to be done then the data is sent to the image format handling layer (1320) for conversion and the appropriate content data is returned.

Then, in step 1450, the now appropriately formatted image data is returned to the requesting client for rendering. After step 1450, the process passes to step 14660, and the process ends.

The system cache manager 1330 provides services for writing and reading cache data. The system cache manager 1330 also provides a configurable interface (via runtime modifiable property files) for initiating pass-through requests to other systems when a write request is received.

Hereinafter, aspects of writing data will be described in accordance with one embodiment of the invention. The cache manager 1330 has two interfaces for writing data into the system. The first is a public interface designed to initiate the cache request. Usually a poller process (1390) or other such process (not shown) will use a pre-determined algorithm to identify which images should be cached. Such an algorithm is generally driven by logic specific to the needs of the business using the system 1300.

The initiating process will send to the system cache manager a request to cache a given image (on the generalized image system's identifiers—not to be confused with one of the underlying image system's identifiers), along with the type of the request (generally a main cache request or an independent cache request). The process may choose to send the data to the cache manager to preserve an additional lookup (for efficiency), or it may simply pass the ID and have the system cache manager initiate the lookup itself.

Generally a single output format is desired for the image viewing clients (1302). To aid in quick processing of images the system cache manager may be configured to request the image format handling layer (1320) to change the format to a pre-configured type before caching the data. This makes the retrieval process of the image request handling subsystem (1310) more efficient since no image conversion is necessary for cached retrieval of this format type.

The second interface is a private interface whose behavior is defined by system configuration (via runtime modifiable property files). The system can be configured with a set of peer caches, which should contain all the data sent to the main cache of the system (though a peer cache may be fed by multiple main caches so it's not necessarily an exact mirror of a particular main cache). When a request is sent to a system configured with peer caches then the request will be automatically passed through to the other systems.

There is no limit to the number of peers. Peers may also have other peers. This provides an advantage when trying to control network traffic. For example, let's say you have an initiating client on the east coast and three server machines, one on the east coast and two on the west coast, which you want to all contain certain cache data. To minimize traffic one can set up west1 as a peer to east and west2 as a peer to west1. An image cache request to east will automatically trigger a pass-through request to west1, which will in turn transmit another pass-through to west2. The data is now on all three servers, but it only had to be transmitted from the east coast to west coast once. Appropriate configuration can allow for an extremely complex and diverse caching system without a complicated client invocation to all these systems.

With regard to reading data, cache read requests are designed to provide redundant access via one or more caches to data. The image request handling subsystem (1310) will make a request to the system cache manager for image content and meta-data. The system cache manager can be configured to read from any number of caches to search for the data. Each system is configured (via runtime modifiable property files) in an order of search. Failure to locate the requested item on a particular cache will initiate a search on the next specified cache and so on until all possibilities are exhausted.

As a result, if a system is down (for normal or emergency reasons) then redundancy is built into the cache system itself. It is also possible to store differing amounts of cached data on different servers. For instance on the first server to be searched, one may only want to store 30 days worth of cached images, but on the second server one may want 60 days. This provides flexibility in the speed of hardware required for efficient retrieval as well as the aforementioned redundancy.

Hereinafter, aspects of various caches, including main cache (1342), peer cache (1344) and independent cache (1346) will be described.

In accordance with one embodiment of the invention, cache transmissions are categorized into one of three major types. Each cache may be any combination of these types depending on what configuration is appropriate.

A main cache is one that receives content requests directly from an initiating process, i.e., a poller process 1390 or other initiating caching process (not shown). A main cache will always pass-through to any configured peers.

A peer cache is one that receives content requests from a main cache. There may be multiple peers for a main cache. A peer may have peer's of its own. Safeguards have been designed into the system to keep track of requests in order to prevent "cache feedback" or "cache looping"—that is prevention of a pass-thru cache request from getting stuck in an endless loop.

A further cache is an independent cache. An independent cache is one which receives a subset of data from another cache. There must be some process (workflow triggered, client, or otherwise) which indicates that an item from one system's cache should be transmitted to another independent cache. This request can push such items to a completely different set of main caches and its peers. An independent cache request is designed to be on a server which already contains cached data, so independent requests do not cache on the server where the request is made. Instead the data gets passed to a remote cache manager for cache on its server and on to any configured peers of that remote server.

As shown in FIG. 13, the image system 1300 includes an image format handling layer 1320. The image format handling layer 1320 utilizes any number of 3rd party applications in order to provide an interface by which programs may request a format change. Some of these formats are generalized formats necessary for display or internal manipulation by the JAVA system and some of them are end-user type formats (such as PDF).

This layer's underlying conversion applications may be replaced, supplemented, or otherwise modified by any suitable application that is necessary for the system to understand. The layer provides a modular design by which such format converters may be plugged in to provide additional access to needed formats.

The format handling layer stands alone in the system as a service by which other components may request conversion without knowing the intimate details of the various formats or how to translate them between each other. At the highest level this can be considered an interpreter between languages.

The image system 1300 further includes a generalized image system data map 1350. The generalized image system provides a generic interface between one or more image systems (1370', 1370", 1370'"). In order to keep track internally of the identifiers available to the public (i.e., generalized image system identifiers) a persistent data translation map is utilized.

Whenever a user requests information that requires the system to obtain content from one of the underlying image systems (1370), the generalized image adapter layer (1360) transparently utilizes the persistent data translation map (1350) to find the appropriate system and native system identifier containing the data.

The generalized image system data map also provides additional functionality beyond a mere one to one mapping. By using this technology the generalized image adapter layer 1360 is able to provide a logical view of the native system's physical images. This allows the users of the generalized image system to modify and view document content in a manner more efficient to the day to day business needs than that which the physical storage may otherwise provide.

In particular to the insurance industry we frequently receive multiple forms as a single, multi-page image. By using the image data map technology it is possible to take these multiple forms and split them out to appear as a number of different documents. While the physical storage in the underlying image system(s) (1370) still represents the way it was received, users of the generalized image system can choose to view them as business functional documents. The translation from physical storage to logical view is transparent to the end-user.

Note that the system caches (1342,1344,1346) store logical documents. In-fact, everything above the generalized image adapter layer (1320) knows only the logical documents. If a business chooses not to utilize any of the modification features it is possible for the logical and physical views to be the same.

In accordance with one embodiment of the invention poller processes may be used. A poller process is any process which interfaces with the system in order to initiate tasks into an external workflow system. A poller process may also utilize the services provided by the generalized image adapter layer (1360) in order to initiate cache requests of images via the system cache manager (1330).

The poller process refers specifically to a process which utilizes the generalize image adapter layer's (1320) service API's that look for new, un-handled images in the underlying image systems (1370).

Hereinafter, aspects of the generalized image adapter layer (image system abstraction layer) 1360 will be described in accordance with one embodiment of the invention. This layer provides transparent access to any number of image systems (1370) via specialized plugins (1380', 1380", 1380'") conforming to the core services requirements of the adapter layer. The adapter layer utilizes the data map technology (1350) to create a logical view of documents contained in the various image systems (1370). The adapter layer 1360 contains the technology capable of performing the necessary merging and splitting of content data into the logical views.

This layer is the core abstraction between the exposed, generalized image world that systems and end-users know and the native image system (1370) world. APIs are provided which transparently provide for the retrieval of content. This layer also provides a set of specifications by which plug-ins may be written to supply generalized access to any image system.

It is the adapter layer 1360 technology working tightly with the data map technology (1350) that allows routing of the content to any number of image systems. It is this same technology that also allows one to convert all the data from one underlying image system 1370 into a completely different one and turn off the original. By this technology the end-users and system can continue to operate without any change even though the underlying system's storage may be changed.

As shown in FIG. 13, the image system 1300 further includes image system plug-in adapters (1380', 1380", 1380'"), as noted above. An image system plug-in adapter is a piece of code that conforms to the generalized adapter layer's (1360) plug-in standards to provide access to an underlying image system (1370). This code utilizes the underlying image system's (1370) native access methods to provide functions that give the adapter layer (1360) the data it needs.

Each plug-in is a lightweight wrapper around a native image system's (1370) basic functionality that retrieves physical image content and any available image data from the system. This information is then manipulated and combined by the adapter layer (1360) technology for abstraction.

As described above, the image system 1300 further includes the underlying image systems (1370', 1370", 1370'"). An underlying image system is any system that is capable of providing for the permanent storage and retrieval of images and image meta-data. Depending on business needs such image systems may allow for deletion of images. However, such image systems 1370 must be capable of providing permanent storage.

In accordance with one embodiment of the invention, these systems do not provide for such things as logical re-organization of images based on business need. All content stored in these systems is in the physical form that they are received, which may or may not be the most business functional method, i.e., depending on business processes used for committal of documents.

The underlying image systems 1370 may vary widely. It is noted that such underlying image systems 1370 may include native workflow engines and very limited capability to perform conversion to differing formats. However, it is noted that generally an underlying image system is functionality very basic, providing for storage, manipulation, and retrieval through a proprietary set of interfaces. The storage format may be anything, as specified by the provider.

As described above, FIGS. 1-14 show various embodiments of the systems and methods of the invention. Hereinafter, general aspects of the implementation of the workflow system 10 will be described.

The system of the invention or portions of the system of the invention as described above may be in the form of a "processing machine," such as a general purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above in the flowcharts. Such a set of instructions for performing a particular task may be characterized as a program, software program, or simply software.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement the invention may be a general purpose computer. However, the processing machine described above may also utilize any of a wide variety of other technologies including a special purpose computer, a computer system including a microcomputer, mini-computer or mainframe for example, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the process of the invention.

It is appreciated that in order to practice the method of the invention as described above, it is not necessary that the processors and/or the memories of the processing machine be physically located in the same geographical place. That is, each of the processors and the memories used in the invention may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing as described above is performed by various components and various memories. However, it is appreciated that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity; i.e., so as to obtain further instructions or to access and use remote memory stores, for example. Such technologies used to provide such communication might include a network, the Internet, Intranet, Extranet, LAN, an Ethernet, or any client server system that provides communication, for example. Such communications technologies may use any suitable protocol such as TCP/IP, UDP, or OSI, for example.

As described above, a set of instructions is used in the processing of the invention. The set of instructions may be in the form of a program or software. The software may be in the form of system software or application software, for example. The software might also be in the form of a collection of separate programs, a program module within a larger program, or a portion of a program module, for example The software used might also include modular programming in the form of object oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments of the invention. Illustratively, the programming language used may include assembly language, Ada, APL, Basic, C, C++, COBOL, dBase, Forth, Fortran, Java, Modula-2, Pascal, Prolog, REXX, Visual Basic, and/or JavaScript, for example. Further, it is not necessary that a single type of instructions or single programming language be utilized in conjunction with the operation of the system and method of the invention. Rather, any number of different programming languages may be utilized as is necessary or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, a EPROM, a wire, a cable, a fiber, communications channel, a satellite transmission or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, voice reader, voice recognizer, dialogue screen, menu box, list, checkbox, toggle switch, a pushbutton or any other device that allows a user to receive information regarding the operation of the processing machine as it processes a set of instructions and/or provide the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications and equivalent arrangements.

What is claimed is:

1. A workflow system for processing an insurance application in an automated manner, the workflow system in the form of a tangibly embodied processing machine constituting a physical structure, the workflow system comprising:
   an interface portion tangibly disposed in the processing machine and constituting a physical structure, the interface portion inputting application information into the workflow system for processing by the workflow system;
   a workflow looping portion tangibly disposed in the processing machine and constituting a physical structure, the workflow looping portion performing processing, the processing including, in sequence:

performing underwriting processing to effect underwriting of the insurance application based on the application information, the performing underwriting processing including:
monitoring the underwriting processing to determine whether the underwriting processing is completed, and
forwarding the insurance application to perform issue processing subsequent to the determining that the underwriting processing is completed;
performing issue processing to effect issue of the insurance application, the performing issue processing including:
monitoring the issue processing to determine whether the issue processing is completed; and
forwarding the insurance application to perform settlement processing subsequent to the determining that the issue processing is completed; and
performing settlement processing to effect settlement of the insurance application, the performing settlement processing including:
monitoring the settlement processing to determine whether the issue processing is completed; and
a rules logic portion tangibly disposed in the processing machine and constituting a physical structure, the rules logic portion controlling the implementation of rules applied to the processing of the insurance application as the insurance application passes through the automated processing; and
wherein the performing underwriting processing, performing issue processing and performing settlement processing are each performed in an automated manner to constitute automated processing of the insurance application, such that the automated processing includes the performing underwriting processing, performing issue processing and performing settlement processing.

2. The workflow system of claim 1, further including a wait state portion, the wait state portion imposing wait states on the automated processing such that the automated processing is suspended until the wait state imposed by the wait state portion is ended.

3. The workflow system of claim 2, wherein the wait state portion imposes the wait state because the wait state portion identifies that there is insufficient information available to underwrite the insurance application, the wait state being imposed in the underwriting processing.

4. The workflow system of claim 3, wherein the wait state portion ends the wait state once information is received to cure the insufficient information, and subsequently, the workflow looping portion re-starts the underwriting processing.

5. The workflow system of claim 4, wherein the received information is a document.

6. The workflow system of claim 2, wherein the wait state portion imposes the wait state because the wait state portion identifies that there is a required task to be performed by a person.

7. The workflow system of claim 2, wherein the wait state portion imposes the wait state because the wait state portion identifies that required is the resolution of at least one selected from the group consisting of a case management issue, a legal issue and an administrative issue.

8. The workflow system of claim 1, wherein the workflow system further includes a task logic portion, the task logic portion identifying, based on particulars of an insurance application, a need for completion of a task to effect the automated processing.

9. The workflow system of claim 8, wherein the task is associated with a document used in the automated processing.

10. The workflow system of claim 9, wherein the task is a discrepancy in the document requiring human intervention.

11. The workflow system of claim 8, wherein the task logic portion identifies the task as an item requiring human review.

12. The workflow system of claim 8, wherein the task logic portion identifies the task based on:
identifying a change to information used in the automated processing by a first person; and
identifying that a second person is required to review the change under the automated processing, the task being a verify task.

13. The system of claim 8, further including:
a wait state portion, the wait state portion imposing a wait state on the automated processing such that the automated processing is suspended until the wait state imposed by the wait state portion is ended; and
the wait state portion imposes the wait state because there is a task to be performed; and
wherein the task logic portion effects form validation processing, the form validation processing:
identifying a change in a changed document in the automated processing;
wiping clean all tasks associated with the changed document;
scrubbing information in the changed document; and
checking the changed document for deficiencies.

14. The workflow system of claim 8, wherein the task logic portion making an association to effect completion of the task; and
the making an association to effect completion of the task includes the task logic portion associating the identified task to a person.

15. The workflow system of claim 8, wherein the task logic portion making an association to effect completion of the task; and
the making an association to effect completion of the task includes the task logic portion associating the identified tasks to a group.

16. The workflow system of claim 8, wherein the task logic portion making an association to effect completion of the task; and
the making an association to effect completion of the task includes the task logic portion disposing the task for access by at least one of a person and a group.

17. The workflow system of claim 8, wherein the task logic portion generates indicia that is associated with an insurance application, and provides for a user to access the workflow system, and identify their need to perform the task, based on the indicia.

18. The workflow system of claim 17, wherein the task logic portion places information in a queue so as to identify the task to a person, who is identified to complete the task.

19. The workflow system of claim 1, further including a case management portion, the case management portion allowing a user to enter instructions to terminate processing of an insurance application in the workflow system; and
the case management portion forwarding the insurance application to an external system, outside the workflow system, based on the instructions; and
the insurance application being forwarded to the external system for further processing in the external system.

20. The workflow system of claim 1, further including a case management portion, the case management portion monitoring the status of insurance applications undergoing automated processing in the workflow system, the case management portion, upon user request, outputting information to the user regarding the status of such insurance applications.

21. The workflow system of claim 20, wherein the case management portion inputs external application status information, the external application status information being input from at least one external system regarding the processing of insurance applications in the at least one external system, the case management portion, upon user request, outputting the external application status information for review.

22. The workflow system of claim 1, further including a rules logic portion, the rules logic portion effecting processing on the application information relating to entity information to assist in data entry of the entity information; and
wherein the entity information includes at least one selected from the group consisting of owner information and beneficiary information.

23. The workflow system of claim 22, wherein the rules logic portion:
analyzes the entity information to determine a corresponding template;
presents the template to a data entry operator; and
interfaces with the data entry operator to input the entity information into the workflow system using the template.

24. The workflow system of claim 23, wherein the template is selected from a group of templates, each template in the group of templates respectively corresponding to a type of designation.

25. The workflow system of claim 24, wherein the type of designation is one selected from an individual, trust and estate.

26. The workflow system of claim 1, wherein the workflow looping portion processes a replacement application, the replacement application being an insurance application that replaces a previously existing insurance application;
the workflow system further including rules logic portion, the rules logic portion:
determining the type of replacement associated with the replacement application; and
identifies replacement regulations for use in the automated processing of the replacement application.

27. The workflow system of claim 26, wherein the rules logic portion automatically sends replacement co-notices and policy summaries associated with the automated processing of the replacement application.

28. The workflow system of claim 1, further including a customer profile-interaction portion, the customer profile-interaction portion:
identifying that an interaction with a customer is going to occur in the automated processing;
retrieving customer profile information from a database; and
providing the customer profile information for use in the workflow system in the interacting with the customer.

29. The workflow system of claim 1, further including a business coordinator portion, the business coordinator portion effecting interfacing of the workflow system with at least one external system, the external workflow system being outside the workflow system.

30. The workflow system of claim 29, wherein the effecting interfacing of the workflow system with at least one external system includes the business coordinator portion:
analyzing indicia associated with a new document input into the workflow system; and
based on the analyzing the indicia, determining a destination at which the document should be processed; and
generating information so that the document is available at the destination.

31. The workflow system of claim 1, wherein the business coordinator portion coordinates operations between the workflow system and the at least one external system.

32. The workflow system of claim 29, wherein the business coordinator portion outputs application information to the at least one external system for the external processing by the at least one external system.

33. The workflow system of claim 32 wherein the business coordinator portion coordinates re-entry of the insurance application that was outputted for external processing.

34. The workflow system of claim 32, wherein the outputting the application information to the at least one external system is done automatically based on application of rules.

35. The workflow system of claim 32, wherein the outputting the application information to the at least one external system is done subsequent to a humane user review of the insurance application being output.

36. The workflow system of claim 1, further including an imaging system that presents images to a user, the image system comprising:
an image request handling subsystem for outputting images to at least one image viewing client that interfaces with a user;
a plurality of image systems each providing for the permanent storage of images;
at least one cache that provides for temporary storage of images;
an image adaptor layer, the image adaptor layer providing an interface layer between the plurality of image systems and both the image request handling subsystem and the at least one cache; and
an image format handling layer that performs format change processing to the image adaptor layer.

37. A non-transitory computer readable medium that processes an insurance application in an automated manner, the computer readable medium tangibly embodied in a processing machine constituting a physical structure, the computer readable medium comprising:
an interface portion tangibly disposed in the processing machine and constituting a physical structure, the interface portion inputting application information into the work-flow system for processing by the workflow system;
a workflow looping portion tangibly disposed in the processing machine and constituting a physical structure, the workflow looping portion including:
performing underwriting processing to effect underwriting of the insurance application based on the application information, the performing underwriting processing including:
monitoring the underwriting processing to determine whether the underwriting processing is completed, and
forwarding the insurance application to perform issue processing subsequent to the determining that the underwriting processing is completed;
performing issue processing to effect issue of the insurance application, the performing issue processing including:
monitoring the issue processing to determine whether the issue processing is completed; and
forwarding the insurance application to perform settlement processing subsequent to the determining that the issue processing is completed; and
performing settlement processing to effect settlement of the insurance application, the performing settlement processing including:

monitoring the settlement processing to determine whether the issue processing is completed; and a rules logic portion tangibly disposed in the processing machine and constituting a physical structure, the rules logic portion controlling the implementation of rules applied to the processing of the insurance application as the insurance application passes through the automated processing; and wherein the performing underwriting processing, performing issue processing and performing settlement processing are each performed in an automated manner by the computer readable medium to constitute automated processing of the insurance application, such that the automated processing includes the performing underwriting processing, performing issue processing and performing settlement processing.

38. A method for processing an insurance application in an automated manner, the method implemented on a tangibly embodied physical processing machine constituting a physical structure, the method comprising:

inputting, by the physical processing machine, application information into the workflow system for processing by the workflow system;

effecting workflow looping processing, by the physical processing machine, the workflow looping processing including:

performing underwriting processing to effect underwriting of the insurance application based on the application information, the performing underwriting processing including:

monitoring the underwriting processing to determine whether the underwriting processing is completed, and forwarding the insurance application to perform issue processing subsequent to the determining that the underwriting processing is completed;

performing issue processing to effect issue of the insurance application, the performing issue processing including:

monitoring the issue processing to determine whether the issue processing is completed; and forwarding the insurance application to perform settlement processing subsequent to the determining that the issue processing is completed; and performing settlement processing to effect settlement of the insurance application, the performing settlement processing including:

monitoring the settlement processing to determine whether the issue processing is completed; and controlling, by the physical processing machine, the implementation of rules applied to the processing of the insurance application as the insurance application passes through the automated processing, the rules controlling processing of the insurance application; and wherein the performing underwriting processing, performing issue processing and performing settlement processing are each performed in an automated manner to constitute automated processing of the insurance application, such that the automated processing includes the performing underwriting processing, performing issue processing and performing settlement processing.

* * * * *